(12) United States Patent
Kawaguchi et al.

(10) Patent No.: US 8,852,737 B2
(45) Date of Patent: Oct. 7, 2014

(54) COATING COMPOSITION AND PHOTOCHROMIC OPTICAL ARTICLE

(75) Inventors: Ikumi Kawaguchi, Shunan (JP); Hironobu Nagoh, Shunan (JP); Katsuhiro Mori, Shunan (JP)

(73) Assignee: Tokuyama Corporation, Shunan (JP)

( * ) Notice: Subject to any disclaimer, the term of this patent is extended or adjusted under 35 U.S.C. 154(b) by 898 days.

(21) Appl. No.: 12/519,113

(22) PCT Filed: Feb. 21, 2008

(86) PCT No.: PCT/JP2008/052953
§ 371 (c)(1), (2), (4) Date: Jun. 12, 2009

(87) PCT Pub. No.: WO2008/105306
PCT Pub. Date: Sep. 4, 2008

(65) Prior Publication Data
US 2010/0110521 A1    May 6, 2010

(30) Foreign Application Priority Data

Feb. 22, 2007 (JP) .................... 2007-042007
Nov. 27, 2007 (JP) .................... 2007-306243

(51) Int. Cl.
| | |
|---|---|
| *C09D 4/00* | (2006.01) |
| *B32B 9/00* | (2006.01) |
| *B32B 27/00* | (2006.01) |
| *B05D 5/06* | (2006.01) |
| *G02B 5/23* | (2006.01) |
| *G02B 1/10* | (2006.01) |
| *C09D 7/12* | (2006.01) |
| *C09D 183/06* | (2006.01) |
| *C09D 183/04* | (2006.01) |
| *C08K 3/36* | (2006.01) |
| *C08K 5/5435* | (2006.01) |
| *C08G 77/14* | (2006.01) |

(52) U.S. Cl.
CPC ... *G02B 5/23* (2013.01); *C08K 3/36* (2013.01); *C09D 7/1266* (2013.01); *C09D 183/06* (2013.01); *C09D 183/04* (2013.01); *C08K 5/5435* (2013.01); *C09D 7/1216* (2013.01); *G02B 1/105* (2013.01); *C08G 77/14* (2013.01)
USPC ........... 428/331; 428/323; 359/241; 427/162; 427/164

(58) Field of Classification Search
None
See application file for complete search history.

(56) References Cited

U.S. PATENT DOCUMENTS
4,211,823 A    7/1980    Suzuki et al.
(Continued)

FOREIGN PATENT DOCUMENTS
EP    0 526 975 A2    2/1993
(Continued)

OTHER PUBLICATIONS
Extended European Search Report issued on Sep. 3, 2012 in corresponding European patent application No. 08720784.1.

*Primary Examiner* — Monique Jackson
(74) *Attorney, Agent, or Firm* — Birch, Stewart, Kolasch & Birch, LLP

(57) ABSTRACT

[Problem] To provide a coating composition capable of forming a hard coating on the surfaces of an optical base member such as a plastic lens featuring highly closely adhering property, excellent transparency and excellent scratch resistance. [Means for Solution] The coating composition comprise (a) a fine granular silica having a grain size of not larger than 30 nm; (b) organosilicon compound components containing an epoxy group-containing organosilicon compound (b1) and tetraalkoxysilane (b2) at a mass ratio (b1/b2) of 0.25 to 4.0; (c) water; and (d) a curing catalyst comprising a complex containing aluminum as a core metal, wherein the fine granular silica (a) is contained in an amount of 15 to 55 parts by mass, the water (c) is contained in an amount of 30 to 200 parts by mass and the curing catalyst (d) is contained in an amount of 0.1 to 5.0 parts by mass per the total amount of the fine granular silica (a) and the organosilicon compound components (b) of 100 parts by mass.

11 Claims, 1 Drawing Sheet

(56) References Cited

U.S. PATENT DOCUMENTS

| | | | |
|---|---|---|---|
| 5,134,191 A | 7/1992 | Takarada et al. | |
| 5,733,644 A * | 3/1998 | Tanaka et al. | 428/215 |
| 5,789,476 A * | 8/1998 | Iryo et al. | 524/430 |
| 7,144,598 B2 * | 12/2006 | Moravec et al. | 427/164 |
| 2004/0220292 A1 | 11/2004 | Momoda et al. | |
| 2005/0118429 A1 * | 6/2005 | Taylor | 428/412 |
| 2008/0241372 A1 | 10/2008 | Tahara et al. | |
| 2010/0091373 A1 * | 4/2010 | Naito | 359/586 |

FOREIGN PATENT DOCUMENTS

| | | |
|---|---|---|
| EP | 1 327 670 A2 | 7/2003 |
| EP | 1 978 382 A1 | 10/2008 |
| JP | 53-111336 A | 9/1978 |
| JP | 6-347605 A | 12/1994 |
| JP | 8-113760 A | 5/1996 |
| JP | 10-168389 A | 6/1998 |
| JP | 2001-520699 A | 10/2001 |
| JP | 2002-265869 A | 9/2002 |
| JP | 2002-543235 A | 12/2002 |
| JP | 2003-342310 A | 12/2003 |
| WO | WO-98/46692 A1 | 10/1998 |
| WO | WO-00/64992 A1 | 11/2000 |
| WO | WO-03/011967 A1 | 2/2003 |
| WO | WO-2005/087882 A1 | 9/2005 |
| WO | WO-2007/086320 A1 | 8/2007 |

* cited by examiner

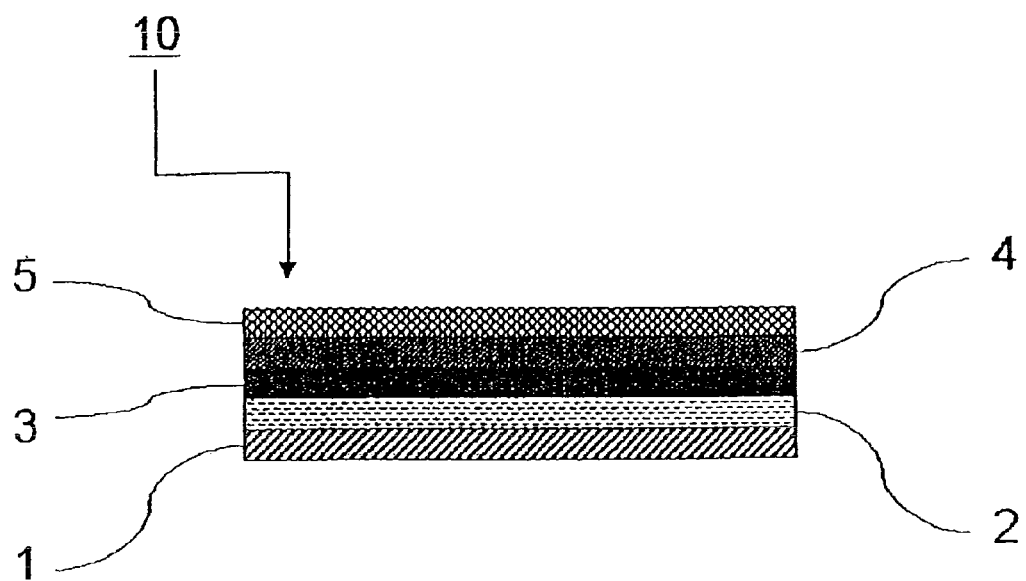

_US 8,852,737 B2_

COATING COMPOSITION AND PHOTOCHROMIC OPTICAL ARTICLE

TECHNICAL FIELD

The present invention relates to a coating composition for forming a hard coating that exhibits a high scratch resistance when applied to the surfaces of optical base members such as plastic lenses. Particularly, the invention relates to a coating composition for forming an optimum hard coating on the surfaces of photochromic optical base members such as photochromic plastic lenses.

BACKGROUND ART

In order to improve scratch resistance, optical base materials such as plastic lenses have their surfaces coated with a coating composition which is, then, cured to form a hard coating which is transparent and is highly hard. The coating composition for forming such a hard coating is, usually, blended with fine metal oxide particles, such as a silica sol that is dispersed like a colloid in addition to being blended with an organosilicon compound (curing component for forming film) such as alkoxysilane in order to form a cured body (hard coating) satisfying the above properties and exhibiting excellent adhesion to the base member (see patent documents 1 to 3).

On the other hand, one of the optical base materials that require the above hard coating is a photochromic lens. The photochromic lens is a lens which, when used outdoors where it is irradiated with light containing ultraviolet rays, such as sunlight, quickly develops a color and functions as sunglasses and, when used indoors where it is irradiated with no such light, permits the color to fade out and functions as ordinary transparent spectacles, and its demand is increasing in recent years. An imbibition method, an in-mass method and a coating method have been known for producing photochromic lenses.

The imbibition method is a method of imparting photochromic properties to ordinary plastic lenses by having the surfaces of the plastic lenses without photochromic property imbibe a photochromic compound.

The in-mass method is a method of directly obtaining photochromic lenses by dissolving a photochromic compound in a monomer and polymerizing the monomer in this state.

The coating method is a method of forming a layer (photochromic coating) having photochromic properties by applying a curable composition (photochromic coating agent) containing a photochromic compound onto the surfaces of the plastic lenses and curing the coating.

Among these methods, the coating method, in principle, has an advantage of more easily imparting photochromic properties to any lens base material than the above two other methods. For example, the lens used in the imbibition method must be a soft material which permits the photochromic compound to easily diffuse therein. The in-mass method, on the other hand, must use a special monomer in which the photochromic compound dissolves to a high degree to develop favorable photochromic properties. The coating method, on the other hand, imposes no such limitations on the base member.

Here, when the photochromic plastic lens is produced by the coating method, the photochromic coating formed on the lens base member has a small thickness. To obtain a photochromic coating that develops a color of a practical density, therefore, the coating must contain the photochromic compound at a high concentration. Chromene derivatives are used as the above photochromic compounds. Among them, a chromene derivative having an amino group exhibits particularly excellent coloring property and a quickly fading rate (see patent documents 4 and 5).

A hard coating which is transparent and highly hard is also formed on the surfaces of photochromic lenses produced by the above various methods in order to improve scratch resistance. For example, a patent document 4 discloses an example of using a coating agent (TS56H, trade name) manufactured by Tokuyama Co. being applied on the photochromic coating that contains an amine compound in order to improve close adhesion to the lens base member. This coating agent is a product produced by the present applicant and is a curable composition containing a silica sol and alkoxysilane other than tetraalkoxysilane.

Patent document 1: JP-A-53-111336
Patent document 2: JP-A(T2)-2001-520699
Patent document 3: JP-A(T2)-2002-543235
Patent document 4: leaflet of International Laid-Open WO2003/011967
Patent document 5: JP-A-2003-342310

DISCLOSURE OF THE INVENTION

Problems to be Solved by the Invention

However, the present inventors have learned through their study that the following problems arouse if a hard coating is formed on the surfaces of the above-mentioned photochromic lenses.

That is, when used for extended periods of time, the photochromic lens on which the hard coating is formed tends to exhibit yellowish color. For example, when an acceleration testing is conducted by using the Xenon Weather-Ometer X25 manufactured by Suga Shikenki Co. (using a xenon arc lamp of 2.5 kW, under the conditions of an irradiation intensity of 40 W/m$^2$ and a lens surface temperature of 50° C.) for 100 hours (corresponds to a service life of about 5 years), the degree of yellow deterioration ($\Delta$YI) of the photochromic lens exceeds 3.5 still leaving room for improvement.

Further, a photochromic lens may have a hard coating formed on the photochromic coating that contains a particular photochromic compound with amino group at a high concentration. In this case, the photochromic lens tends to exhibit slightly reddish color when the lens has not been irradiated with light. Further, a photochromic lens may have a hard coating formed on the photochromic coating that contains a particular photochromic compound with amino group and another photochromic compound to adjust the color tone that is to be developed. In this case, however, it often happens that the photochromic lens fails to develop a desired color tone but tends to exhibit a reddish color tone.

Moreover, when the hard coating is formed on the photochromic coating, the coating composition is poorly cured being affected by the photochromic compound that is contained in the photochromic coating at a high concentration making it difficult to form a hard coating having sufficiently high scratch resistance.

It is, therefore, an object of the present invention to provide a coating composition capable of forming a hard coating on the surfaces of an optical base member such as a plastic lens featuring highly closely adhering property, excellent transparency and excellent scratch resistance.

Another object of the present invention is to provide a coating composition capable of forming a hard coating on the surfaces of a photochromic optical article having a photochromic coating formed by a coating method, without arousing the above-mentioned problem of yellow deterioration.

A further object of the present invention is to provide a coating composition capable of forming a hard coating on the photochromic coating that contains a photochromic compound having, particularly, an amino group, effectively preventing the above-mentioned problems of yellow deterioration, red deterioration and poor curing.

A still further object of the present invention is to provide a photochromic optical article on which the above hard coating is formed and a method of producing the same.

Means for Solving the Problems

According to the present invention, there is provided a coating composition comprising:

(a) a fine granular silica having a grain size of not larger than 30 nm;

(b) organosilicon compound components containing an epoxy group-containing organosilicon compound (b1) and tetraalkoxysilane (b2) at a mass ratio (b1/b2) of 0.25 to 4.0;

(c) water; and (d) a curing catalyst comprising a complex containing aluminum as a core metal;

wherein the fine granular silica (a) is contained in an amount of 15 to 55 parts by mass, the water (c) is contained in an amount of 30 to 200 parts by mass and the curing catalyst (d) is contained in an amount of 0.1 to 5.0 parts by mass per the total amount of the fine granular silica (a) and the organosilicon compound components (b) of 100 parts by mass.

It is desired that the coating composition of the invention further contains a water-soluble organic solvent (e) in an amount of 10 to 200 parts by mass per the total amount of the fine granular silica (a) and the organosilicon compound components (b) of 100 parts by mass, a mass ratio (c/e) of the water (c) and the water-soluble organic solvent (e) being 0.5 to 10.0.

According to the present invention, further, there is provided a photochromic optical article comprising a photochromic optical base member and a hard coating formed on the surface of the photochromic optical base member, the hard coating being obtained by curing the above coating composition.

In the photochromic optical article of the present invention, it is desired that:

(1) the photochromic optical base member has a photochromic coating formed on the surface of a light-transmitting member by curing a curable composition that contains a photochromic compound, and the hard coating is formed on the surface of the photochromic coating;

(2) the photochromic coating is obtained by photo-polymerizing a curable composition that contains at least one kind of photochromic compound;

(3) the light-transmitting member is a plastic lens, and the photochromic coating has a Vickers' hardness of 0.3 to 10 kg/mm$^2$;

(4) the photochromic compound has an amino group;

(5) the amino group has a substituted group with 1 to 10 carbon atoms;

(6) the substituent possessed by the amino group is a heterocyclic group containing a nitrogen atom constituting the amino group as a hetero atom, and the number of the hetero atom in the heterocyclic group is not larger than 4;

(7) the amino group is a dialkylamino group; and (8) the photochromic optical article exhibits a degree of yellow deterioration ($\Delta YI$) of not larger than 3.5 when it is irradiated with light for 100 hours by using a xenon arc lamp of 2.5 kW as a source of light under the conditions of an irradiation intensity of 40 W/m$^2$ and an irradiated surface temperature of 50° C.

According to the present invention, further, there is provided a method of producing a photochromic optical article comprising the steps of:

forming a photochromic coating by applying a curable composition containing 0.1 to 10.0% by mass of a photochromic compound having an amino group onto a light-transmitting member, and curing the curable composition; and forming a hard coating by applying the above mentioned coating composition onto the photochromic coating and curing the coating composition.

Effect of the Invention

The coating composition of the present invention has an important feature in that it comprises (a) a fine granular silica having a grain size of not larger than 30 nm, (b) organosilicon compound components, (c) water, and (d) a curing catalyst comprising a complex having aluminum as a core metal, and that the organosilicon compound components (b) contain an epoxy group-containing organosilicon compound (b1) and tetraalkoxysilane (b2) at a predetermined mass ratio (b1/b2=0.25 to 4.0), making it possible to form a transparent hard coating on various kinds of optical base members and, particularly, on plastic lenses maintaining good adhering property and excellent scratch resistance. Particularly, the hard coating formed by using the above coating composition offers scratch resistance which pertains to the top level as compared with the hard coatings obtained by using the known coating compositions.

The coating composition of the present invention is used for forming a hard coating on the surface of a photochromic optical base member such as a photochromic lens, and exhibits a distinguished effect particularly when a hard coating is formed on the surface of the photochromic optical base member obtained by the coating method. That is, when the hard coating is formed on the surface of the photochromic optical base member, problems arouse such as poor curing and yellow deterioration after used for extended periods of time. Besides, use of the photochromic compound having an amino group involves a problem of red deterioration. Forming the hard coating by using the coating composition of the present invention, on the other hand, is accompanied by none of the problems of yellow deterioration, poor curing or red deterioration. As will be described in Examples appearing later, the problems specific to the above photochromic optical base member cannot be prevented if any one of the above components (a) to (d) is missing or if a predetermined ratio of amounts is not satisfied despite the components (a) to (d) are contained.

The reasons for effectively preventing the problems of yellow deterioration, poor curing and red deterioration by using the coating composition of the present invention have not been clarified yet, but the present inventors speculate them as descried below.

That is, when a hard coating is formed on the surface of the photochromic optical base member obtained by the coating method, a photochromic compound contained at a high concentration in a thin photochromic coating formed on the surface of the optical base member is deteriorated with oxygen that permeates through the hard coating under the irradiation with light. As a result, it is considered that the photochromic compound exhibits yellowish color after used for extended periods of time. Besides, the photochromic compound present at a high concentration in the thin coating comes in contact with the curing catalyst at the time of curing the coating composition, lowering the curability of the curing catalyst and, therefore, the curing is poorly effected. Further, when the photochromic compound has the amino group, it is considered that the photochromic compound exhibits reddish color when it has not been irradiated with light due to the interaction between the amino group-containing photochromic compound that has migrated into the hard coating and the fine metal oxide particles such as fine silica particles contained in the hard coating.

With the coating composition of the present invention containing the above components (a) to (d) at a predetermined ratio of amounts, on the other hand, it is considered that the hard coating that is formed adheres to the photochromic coating highly closely and, besides, the fine granular silica (a) is homogeneously and firmly bonded and fixed in the hard coating. Therefore, the hard coating that is formed has a high glass transition temperature (Tg) (e.g., not lower than 150° C. and, particularly, not lower than 160° C.), and becomes dense and highly hard since the molecular motion has been very limited therein. As a result, the hard coating exhibits a very high scratch resistance and effectively avoids the transmission of oxygen through the hard coating. It is, therefore, made possible to effectively prevent the problem of yellow deterioration when used for extended periods of time, that presumably stems from the deteriorated photochromic compound due to the permeation of oxygen under the irradiation with light.

The hard coating which is dense and highly hard works to effectively suppress the photochromic compound from migrating into the hard coating. As a result, it is presumed that despite the photochromic compound has an amino group, the interaction is suppressed between the photochromic compound and the fine silica particles and, therefore, the problem of red deterioration is effectively prevented.

Further, the curing catalyst used in the present invention is highly reactive with the epoxy group-containing organosilicon compound and is considered to exhibit enhanced curing capability when water is used in large amounts. As a result, the effect of the photochromic compound in the photochromic layer is effectively suppressed and the problem of poor curing is effectively avoided.

Therefore, the coating composition of the present invention can be most desirably used particularly for forming a hard coating on the surface of the photochromic optical base member obtained by the coating method. In particular, the coating composition has not so far been known that is capable of solving the above particular problem that occurs when a hard coating is formed on the surface of the photochromic optical base member. Therefore, the coating composition of the present invention is a novel composition. For example, a coating composition using fine granular silica of not larger than 100 nm has heretofore been known and, besides, a complex containing aluminum as a core metal has been known as a curing catalyst. As will be understood from the fact that no coating composition has heretofore been known that is capable of simultaneously solving all problems of yellow deterioration, red deterioration and poor curing at the time of forming a hard coating on the surface of the photochromic optical base member obtained by the coating method, therefore, the coating composition of the present invention had not at all been known using a fine granular silica of not larger than 30 nm and a complex (curing catalyst) with aluminum as a core metal at a predetermined ratio of amount in combination with the epoxy group-containing silicon compound, tetraalkoxysilane and water.

BRIEF DESCRIPTION OF THE DRAWING

FIG. 1 is a sectional view illustrating a representative embodiment of a photochromic optical base member of the present invention.

BEST MODE FOR CARRYING OUT THE INVENTION

<Coating Composition>

The coating composition of the invention contains, as essential components, (a) a fine granular silica, (b) organosilicon compound components, (c) water and (d) a complex containing a core metal of aluminum as a curing catalyst. As required, the coating composition of the invention is further blended with known additive components, applied onto the surface of a transparent member and is cured to form a hard coating which is transparent and exhibits excellent scratch resistance.

Fine Granular Silica (a):

The fine granular silica used in the present invention has a grain size of not larger than 30 nm. That is, the fine granular silica densely disperses in the hard coating presumably contributing to increasing barrier property against oxygen and suppressing the photochromic compound from migrating into the hard coating. For example, if the fine granular silica having a grain size in excess of 30 nm is used, it becomes difficult to solve the above problem of yellow deterioration to a sufficient degree.

The grain size of the fine granular silica is not that of an aggregate thereof but is that of primary grains thereof. If the grain size is smaller than 30 nm, therefore, the fine granular silica does not substantially contain coarse grains of which the primary grain size is in excess of 30 nm, or contains coarse grains in an amount of less than 1% by mass and, particularly, less than 0.5% by mass. The grain size of the fine granular silica can be measured as observed by using an electron microscope (TEM) of a magnification of 150,000 times.

The fine granular silica is usually dispersed in an aqueous organic solvent or water, and is handled as a dispersion solution. Therefore, the grain size is measured by drying the dispersion solution. Concretely speaking, the concentration of the dispersion solution is adjusted by suitably adding a dispersion medium thereto such that the concentration becomes 0.1% by mass. Thereafter, the dispersion solution is dropped on a support member such as carbon film, dried at room temperature, and is observed through the TEM.

As will be understood from the above description, the fine granular silica (a) having a grain size of not larger than 30 nm used in the invention is, usually, blended into the coating composition in a state of a sol obtained by being dispersed in a water-soluble organic solvent or water so that it will not scatter as dust. As the water-soluble organic solvent, an alcohol solvent can be suitably used, such as isopropanol, ethanol, methanol or ethylene glycol. It is, however, also allowable to use methyl ethyl ketone, methyl isobutyl ketone or dimethyl acetamide.

The silica sol is industrially available. For example, sols using water as a dispersant have been placed in the market by Nissan Kagaku Kogyo Co. in the trade names of Snowtex OXS, Snowtex OS, Snowtex O, Snowtex O-40, etc. Sols using a water-soluble organic solvent as a dispersion medium have been placed in the market by Nissan Kagaku Kogyo Co. in the names of Methanol Silica Sol, MA-ST-MS (dispersant; methanol), IPA-ST (dispersant; isopropanol).

In the present invention, it is most desired to use the fine granular silica in the form of a sol by dispersing the fine granular silica in water from the standpoint of obtaining more excellent effect and, particularly, solving the problem of yellow deterioration of the photochromic optical base member relying upon a combination of the organosilicon compound components (b) and the curing catalyst (d) that will be described later. In such a sol, it is considered that water used as a dispersion medium contributes to curing (hydrolyzing) the organosilicon compound components (b) and, besides, the surfaces of the fine granular silica are activated. As a result, it is considered that the fine granular silica is densely and homogeneously dispersed in the hard coating to exhibit further improved barrier property against oxygen.

Further, when the fine granular silica is used in the form of a sol, it is desired that the concentration of the solid component in the dispersion solution of fine granular silica is in a range of 10 to 45% by mass and, particularly, the dispersion solution is acidic having a pH of 2 to 4. It is, further, desired to use a dispersion solution containing a small amount of sodium which is often contained as stabilizing ions. By using the dispersion solution of the fine granular silica, the fine granular silica is stably dispersed in the coating composition that is obtained.

In the present invention, there is no particular limitation on the fine granular silica if the fine granular silica as a whole has a grain size of not larger than 30 nm. Generally, however, the photochromic optical base member is highly effectively prevented from being red deteriorated or yellow deteriorated if the grain size is small. It is desired to use an ultrafine granular silica having a grain size of, for example, not larger than 7 nm and, particularly, 4 to 6 nm. By taking the dispersion stability of fine granular silica in the coating composition into consideration, however, it is desired that the ratio of the ultrafine granules having a grain size of not larger than 7 nm in the fine granular silica (a) is not less than 10% by mass, more preferably, 10 to 50% by mass and, further preferably, 15 to 50% by mass per the whole amount of fine granular silica (a) of 100% by mass.

The lower limit value of grain size of the fine granular silica is 1 nm by taking the productivity of fine granules and handling into consideration.

The fine granular silica (a) is blended into the coating composition in an amount of 15 to 55 parts by mass per the total amount (a+b) of the fine granular silica (a) and the organosilicon compound components (b) that will be described later of 100 parts by mass. From the standpoint of scratch resistance of the obtained hard coating and suppressing cracking at the time of curing, in particular, the fine granular silica is blended more desirably in an amount of 20 to 55 parts by mass and, particularly, 25 to 45 parts by mass. When the fine granular silica is blended in the form of a sol, the amount of the fine granular silica corresponds to the amount of the solid content in the dispersed solution, and the amount of water contained in the dispersion solution is included in the amount of water (c) that will be described later.

Organosilicon Compound Components (B):

In the coating composition of the present invention, the organosilicon compound components (b) form a transparent cured body that serves as a matrix when the coating composition is cured to form the hard coating, and the fine granular silica (a) disperses in the cured body formed by the organosilicon compound components (b). The organosilicon compound components (b) are used in an amount of 85 to 45 parts by mass, preferably, 80 to 45 parts by mass and, most preferably, 75 to 55 parts by mass per the total amount (a+b) of the above fine granular silica (a) and the organosilicon compound components (b) of 100 parts by mass. By using the organosilicon compound components (b) and the fine granular silica (a) in such amounts, it is allowed to enhance scratch resistance of the hard coating formed by using the coating composition while effectively avoiding poor curing and occurrence of cracks at the time of curing.

In the present invention, the organosilicon compound components (b) must contain an epoxy group-containing organosilicon compound (b1) and tetraalkoxysilane (b2) in amounts of a mass ratio (b1/b2) of 0.25 to 4.0. The epoxy group-containing organosilicon compound is a component for enhancing adhesion of the hard coating to the base member. The tetraalkoxysilane is a tetrafunctional silane compound and is necessary for forming a hard coating which is dense having a high glass transition point (Tg).

In the present invention, the epoxy group-containing organosilicon compound (b1) and tetraalkoxysilane (b2) are used in amounts of the above ratio making it possible not only to form a hard coating having excellent scratch resistance which is excellently adhered to the optical base member such as a plastic lens but also to prevent all problems such as yellow deterioration, red deterioration and poor curing that occur at the time of forming a hard coating on the surface of the photochromic optical base member obtained by the coating method. For example, when either the epoxy group-containing organosilicon compound (b1) or tetraalkoxysilane (b2) is not used or even when the above two components are used, some of the above problems can be solved but the above problems cannot be all solved if the ratio of amounts lies outside the above range. For example, if the mass ratio (b1/b2) of the epoxy group-containing organosilicon compound and tetraalkoxysilane exceeds 4.0, it becomes difficult to form a dense and hard coating, and the program of red deterioration or the problem of yellow deterioration cannot be sufficiently solved. If the mass ratio (b1/b2) is smaller than 0.25, on the other hand, it becomes difficult to form a hard coating having a uniform thickness, decreasing the adhesion to the optical base member such as plastic lens, causing the curing to become poor and permitting cracks to occur in the hard coating.

As the epoxy group-containing organosilicon compound (b1), there can be preferably used a silicon compound having an epoxy group as well as a hydrolyzing group such as alkoxy group in the molecules. Concretely, a silane compound represented by the following formula (1) can be preferably used, $$(R^1)_A(R^2)Si(OR)_{3-A} \quad (1)$$

wherein,

R and $R^1$ are, independently from each other, lower alkyl groups having 1 to 3 carbon atoms, $R^2$ is an epoxy group-containing organic group, and "A" is an integer of 0, 1 or 2.

Concerning the groups R and $R^1$, the lower alkyl groups may be those having carbon atoms in a number of 1 to 3. From the standpoint of safety and reactivity, in particular, it is desired that R and $R^1$ are methyl groups or ethyl groups. Further, "A" representing the number of R and $R^1$ is 0 or 1. That is, the above silane compound desirably has 3 or 2 alkoxy groups from the standpoint of forming a dense and hard coating. Further, when R or $R^1$ are present in a plural number in the molecules, the plurality of R or $R^1$ may be different from each other.

Further, the epoxy group-containing organic group represented by $R^2$ is a group represented by the following formula (1A):

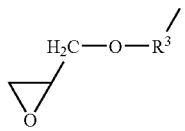
(1A)

wherein $R^3$ is an alkylene group having 1 to 8 carbon atoms, or a group represented by the following formula (1B):

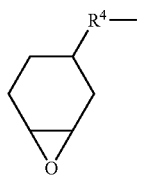
(1B)

wherein $R^4$ is an alkylene group having 1 to 8 carbon atoms.

The alkylene groups represented by $R^3$ and $R^4$ in the above formulas (1A) and (1B) may be those of a straight chain or a branched chain provided the number of carbon atoms is in a range of 1 to 8. From the standpoint of easy availability, however, it is desired that the alkylene groups are those of the straight chain having 2 or 3 carbon atoms.

Concrete examples of the epoxy group-containing organosilicon compound represented by the above formula (1) include:
γ-glycidoxypropyltrimethoxysilane,
γ-glycidoxypropylmethyldimethoxysilane,
γ-glycidoxypropylmethyldiethoxysilane,
γ-glycidoxypropyltriethoxysilane, and
β-(3,4-epoxycyclohexyl)ethyltrimethoxysilane.

Among them, γ-glycidoxypropyltrimethoxysilane and γ-glycidoxypropylmethyldimethoxysilane are preferred from the standpoint of close adhesion to the optical base member such as the plastic lens and the crosslinking property. Further, the epoxy group-containing organosilicon compounds may be used in a single kind or in a mixture of two or more kinds.

As tetraalkoxysilane (b2), there can be exemplified tetramethoxysilane, tetraethoxysilane, tetrapropoxysilane, tetraisopropoxysilane and tetrabutoxysilane. Among them, the tetraethoxysilane is preferred from the standpoint of hydrolyzing rate of the alkoxy group, toxicity and cost.

Further, the organosilicon compound components (b) may include organosilicon compounds in addition to those of (b1) and (b2) above. As the other organosilicon compounds, there can be exemplified mono-, di- and tri-alkoxysilane compounds represented by the following formulas (2) to (4).

Alkoxysilane Compound of the Formula (2):

$$R^5(R^6)_B Si(OR)_{4-B} \quad (2)$$

wherein,
$R^5$ is a hydrocarbon group having 1 to 6 carbon atoms, a vinyl group, a methacryloxy group, an acrylic group, a mercapto group or an amino group-containing organic group,
$R^6$ and R are, respectively, alkyl groups having 1 to 3 carbon atoms, and
"B" is an integer of 1, 2 or 3.

Alkoxysilane Compound of the Formula (3):

$$(R^7)_C Si(OR)_{4-C} \quad (3)$$

wherein,
$R_7$ is a hydrogen atom, a vinyl group, an aryl group or an alkyl group,
R is an alkyl group having 1 to 3 carbon atoms, and
"C" is an integer of 1 or 2.

Alkoxysilane Compound of the Formula (4):

$$(R^9)_D(RO)_{3-D}Si-R^8-Si(OR)_{3-D}(R^{10})_D \quad (4)$$

wherein,
$R^8$ is a straight-chain or branched-chain alkylene group having 1 to 8 carbon atoms,
$R^9$ and $R^{10}$ are alkyl groups having 1 to 3 carbon atoms,
R is an alkyl group having 1 to 3 carbon atoms, and
"D" is an integer of 0 to 2.

Described below are concrete examples of the alkoxysilanes represented by the above formulas (2) to (4).
methyltrimethoxysilane,
methyltriethoxysilane,
n-hexyltrimethoxysilane,
n-octyltrimethoxysilane,
n-octylmethyldimethoxysilane,
n-decyltrimethoxysilane,
n-octadecyltrimethoxysilane,
ethyltriethoxysilane,
phenyltriethoxysilane,
dimethyldimethoxysilane,
phenylmethyldimethoxysilane,
vinyltriethoxysilane,
vinyltrimethoxysilane,
vinyltris(β-methoxyethoxy)silane,
γ-glycidoxypropyltrimethoxysilane,
γ-methacryloxypropyltrimethoxysilane,
N-β(aminoethyl)γ-aminopropyltrimethoxysilane,
N-β(aminoethyl)γ-aminopropylmethyldimethoxysilane,
γ-aminopropyltriethoxysilane,
N-phenyl-γ-aminopropyltrimethoxysilane,
γ-mercaptopropyltrimethoxysilane,
bis(triethoxysilyl)ethane,
bis(trimethoxysilyl)ethane,
bis(triethoxysily)hexane,
bis(diethoxymethylsilyl)hexane,
bis(trimethoxysilyl)hexane,
bis(dimethoxymethylsilyl)hexane,
bis(triethoxysilyl)octane,
bis(trimethoxysilyl)octane,
bis(diethoxymethylsilyl)octane, and
1-(triethoxysilyl)-2-(diethoxymethylsilyl)ethane.

In addition to alkoxysilane represented by the above formulas (2) to (4), it is also allowable to use alkoxysilane compound represented by the following formula (5),

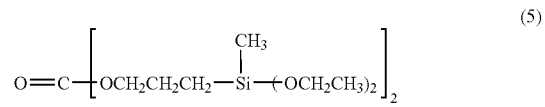
(5)

The alkoxysilane compounds represented by the above formulas (2) to (5) can be used alone or being mixed together in two or more kinds. It is desired that the alkoxysilane compound is used in an amount of not more than 10 parts by mass per the total amount of the epoxy group-containing organosilicon compound (b1) and tetraalkoxysilane (b2) of 100 parts by mass. That is, if the alkoxysilane compound is used in too large amounts, the obtained hard coating loses the density and, besides, it becomes difficult to prevent the yellow deterioration specific to the photochromic optical base member produced by the coating method. According to the present invention, therefore, it is most desired to use only two kinds of the organosilicon compound components (b), i.e., the epoxy group-containing organosilicon compound (b1) and tetraalkoxysilane (b2).

The organosilicon compound components (b) in the coating composition of the present invention may form a partly hydrolyzed product or a partly hydrolyzed condensate depending upon the condition of preserving the coating composition. Even in this case, however, there is no problem so far as the components are used at the above-mentioned ratio of amounts.

Water (c):

It is necessary that the coating composition of the present invention contains water in an amount of 30 to 200 parts by mass, preferably, 30 to 190 parts by mass and, more preferably, 35 to 185 parts by mass per the total amount of the fine granular silica (a) and the organosilicon compound components (b) of 100 parts by mass. Water contained in an amount as described above makes it possible to further heighten the glass transition point of the cured body forming the hard coating and to further improve closely adhering property and scratch resistance of the hard coating.

Though the reason is not yet clear, it is considered that water used in the above-mentioned amount accelerates the hydrolysis of the organosilicon compound components (b), and the curing catalyst (d) acts more effectively on the polycondensation of the organosilicon compound components (b) accelerating the curing. For example, if the amount of water is smaller than the above range, the curing becomes insufficient, a dense and hard coating is not formed, and it becomes difficult to prevent the yellow deterioration specific to the photochromic optical base member produced by the coating method. Further, if water is used in an amount larger than the above range, it becomes difficult to form a hard coating having a uniform thickness.

It is further considered that water used in the above-mentioned amount accelerates the hydrolysis of the organosilicon compound components (b), activates the surfaces of the fine granular silica, and whereby the hydrolyzed product of the organosilicon compound components (b) and the fine granular silica are firmly fixed forming a dense and hard coating. For example, if compared by forming a hard coating on the same photochromic optical base member by using the coating composition containing the same fine granular silica (a), organosilicon compound components (b) and curing catalyst (d) in the same amounts, the coating composition containing water in large amounts is highly capable of solving the problem of yellow deterioration of the photochromic optical base member so far as the above range is satisfied. In particular, the coating composition containing water in an amount of not less than 100 parts by mass, particularly, not less than 120 parts by mass and, most desirably, not less than 140 parts by mass per the total amount of the fine granular silica (a) and the organosilicon compound components (b) of 100 parts by mass, exhibits the most excellent effect for preventing the yellow deterioration of the photochromic optical base member.

As described already, the fine granular silica (b) is, preferably, dispersed in water so as to be used in the form of a dispersion solution (sol). In this case, the amount of water must be adjusted to lie in the above range by taking into consideration the amount of water contained in the dispersion solution. For example, if the amount of water contained in the dispersion solution fails to reach the above-mentioned range of the amount of water, then water must be further added. If the range of the amount of water has been reached, water does not have to be added. Further, if the fine granular silica is used in the form of a sol by using the water-soluble organic solvent as a dispersion medium, water must be added to reach the above-mentioned range of the amount of water, as a matter of course. As will be described later, further, the coating composition may often use an acid aqueous solution for accelerating the hydrolysis and curing of the organosilicon compound components (b). In such a case, too, the amount of water contained in the coating composition must be adjusted to lie in the above-mentioned range by taking the amount of water contained in the acid aqueous solution into consideration.

Curing Catalyst (d):

In the present invention, it is important to use a complex containing aluminum as a core metal (hereinafter often referred to as Al complex). That is, the Al complex used as a curing catalyst effectively accelerates the curing of the organosilicon compound components (b), and not only forms a hard coating which is dense having a high glass transition point (Tg) and excellent scratch resistance but also effectively suppresses the interaction with, for example, the amino group-containing photochromic compound and, as a result, makes it possible to effectively solve the problems of poor curing, yellow deterioration and red deterioration specific to the photochromic optical base member produced by the coating method.

Further, effect of the Al complex serving as the curing catalyst (d) is exhibited to a conspicuous degree when water is used in large amounts. Concretely speaking, the above effect is conspicuously exhibited when water is contained in an amount of, preferably, not less than 100 parts by mass, more preferably, not less than 120 parts by mass and, particularly preferably, not less than 140 parts by mass per the total amount of the fine granular silica (a) and the organosilicon compound components (b) of 100 parts by mass.

The Al complex is used in an amount in a range of 0.1 to 5.0 parts by mass and, particularly, 0.1 to 3.0 parts by mass per the total amount (a+b) of the fine granular silica (a) and the organosilicon compound components (b) of 100 parts by mass.

Further, representative examples of the complex using aluminum as a core metal include Al complexes of acetyl acetonato, ethyl acetoacetate and salicylaldehyde. Among them, the Al complex of acetyl acetonato is referred.

It is also allowable to use other curing catalysts in combination so far as the complex having aluminum as a core metal is used in amounts as described above. Examples of the other curing catalysts may include:

complexes such as acetyl acetonato, ethyl acetoacetate and salycylaldehyde containing Li(I), Cu(II), Zn(II), Co(II), Ni(II), Be(II), Ce(III), Ta(III), Ti(III), Mn(III), La(III), Cr(III), V(III), Co(III), Fe(III), Ce(IV), Zr(IV), V(IV), etc. as core metal atoms;

perchloric acids such as perchloric acid, magnesium perchlorate, aluminum perchlorate, zinc perchlorate and ammonium perchlorate;

organic metal salts such as sodium acetate, zinc naphthenate, cobalt naphthenate and zinc octylate; and Lewis acids such as stannic chloride, aluminum chloride, ferric chloride, titanium chloride, zinc chloride and antimony chloride.

Among them, the complex containing zinc (II) as a core metal is most desired. When other curing catalysts are used in combination, there amounts may be the so-called catalytic amounts.

Other Additives:

The coating composition of the present invention may be further blended with various known additives in addition to the essential components (a) to (d) in a range in which they do not impair the object of the present invention.

For example, a water-soluble organic solvent may be added to enhance the dispersion of the fine granular silica (a). The water-soluble organic solvent can be used as a dispersion medium of sol of the fine granular silica (a). Desirably, the water-soluble organic solvent favorably dissolves the organosilicon compound components (b) and the curing catalyst (d), and is volatile. Concrete examples include:

alcohols such as methanol, ethanol, n-propanol, isopropanol, n-butanol, t-butanol and n-pentanol;

esters such as methyl acetate, ethyl acetate, propyl acetate, ethyl propionate, methyl acetoacetate, ethyl acetoacetate and methyl lactate;

ethers such as ethylene glycol monoisopropyl ether, ethylene glycol monoethyl ether, ethylene glycol mono-n-propyl ether, ethylene glycol mono-n-butyl ether, ethylene glycol mono-t-butyl ether, propylene glycol monomethyl ether, propylene glycol monoethyl ether, propylene glycol mono-n-propyl ether, propylene glycol mono-n-butyl ether, propylene glycol monomethyl ether acetate, propylene glycol monoethyl ether acetate and dioxane; and ketones such as acetone, acetyl acetone and diacetone alcohol.

These organic solvents may be used in a single kind but is, usually, used being mixed together in two or more kinds to control properties such as viscosity and the like of the coating composition.

Among the above water-soluble organic solvents, the present invention preferably uses methanol, isopropanol, t-butanol, acetylacetone, diacetone alcohol or ethylene glycol monoisopropyl ether from the standpoint of dispersing the fine granular silica (a), compatibility with the acid aqueous solution used for decomposing the organosilicon compound components (b) and with water contained in a water dispersion silica sol, easy volatility in forming the coating and forming smooth coating. Though there is no particular limitation, the water-soluble organic solvent is used in an amount desirably in a range of 10 to 200 parts by mass and, particularly, 15 to 150 parts by mass per the total amount of the fine granular silica (a) and the organosilicon compound components (b) of 100 parts by mass. Further, the water-soluble organic solvent used in an amount at a ratio with respect to water (c) (water/water-soluble organic solvent) in a range of 0.5 to 10.0 makes it possible to form a smooth and hard coating without irregularity in the thickness and without affecting the property for preventing the red deterioration or yellow deterioration.

As briefly described above, further, the coating composition of the present invention can be blended with the acid aqueous solution in order to hydrolyze the organosilicon compound and to accelerate the curing property. Though there is no particular limitation, representative examples of the acid include such inorganic acids as hydrochloric acid, sulfuric acid, nitric acid and phosphoric acid as well as such organic acids as acetic acid and propionic acid. From the standpoint of the preservation stability and hydrolysis of the coating composition, however, hydrochloric acid is preferably used. The acid aqueous solution is, preferably, a hydrochloric acid aqueous solution having an acid concentration of 0.01 N to 5 N. The amount of water in the acid aqueous solution should be so adjusted that the whole amount of water in the coating composition lies within the above-mentioned range and should be 0.1 to 3 times the amount necessary for hydrolyzing all hydrolyzing groups (e.g., alkoxy groups of the organosilicon compound components (b). When the fine granular silica (a) is used in the form of a sol using water as a dispersion medium, the acid aqueous solution does not have to be added to decompose the organosilicon compound components (b) provided the coating composition contains water in an amount sufficient for hydrolyzing the alkoxy groups of the organosilicon compound components (b). However, addition of the acid aqueous solution accelerates the hydrolysis, improves the wettability of the coating composition to the optical base member such as the plastic lens base member offering advantage from the standpoint of forming a hard coating featuring uniform thickness and highly adhering property.

The coating composition of the present invention may be, further, suitably blended with fine granular metal oxides in addition to the fine granular silica in amounts in a range in which they do not impair the effect of the invention. Here, such fine granular metal oxides should have grain sizes of not larger than 30 nm like the fine granular silica (a) and should be used in trace amounts of not larger than 5 parts by mass per the total amount of the fine granular silica (a) and the organosilicon compound components (b) of 100 parts by mass.

Further, like the conventional coating compositions used for forming hard coatings, the coating composition of the present invention can, as required, be blended with a variety of additives such as surfactant, antioxidant, ultraviolet ray stabilizer, ultraviolet ray absorber, tint-preventing agent, antistatic agent, fluorescent dye, die, pigment, perfume and the like.

In particular, it is desired to use a surfactant for forming a hard coating having a uniform thickness. The surfactant of any one of the nonionic type, anionic type or cationic type can be used. From the standpoint of stability, however, the nonionic type surfactant is desired. Preferred examples of the nonionic type surfactant include:

sorbitan fatty acid ester,
glycerin fatty acid ester,
decaglycerin fatty acid ester,
propylene glycol pentaerythritol fatty acid ester,
polyoxyethylene sorbitan fatty acid ester,
polyoxyethylene sorbit fatty acid ester,
polyoxyethylene glycerin fatty acid ester,
polyethylene glycol fatty acid ester,
polyoxyethylenealkyl ether,
polyoxyethylenephytosterol phytostanol,
polyoxyethylenepolyoxypropylenealkyl ether,
polyoxyethylenealkylphenyl ether,
polyoxyethylene castor oil cured castor oil,
polyoxyethylenelanolin lanolin alcohol bees wax derivative,
polyoxyethylenealkylamine fatty acid amide,
polyoxyethylenealkylphenyl formaldehyde condensate, and
single-chain polyoxyethylenealkyl ether.

In addition to the above surfactants, a surfactant of the silicone type or the fluorine type can also be favorably used. The silicone type surfactant has the silicone chain (polyalkylsiloxane unit) as a hydrophobic group while the fluorine type surfactant has the carbon fluoride chain as represented by a perfluoroalkyl group-containing ester type oligomer, a perfluoroalkyl group-containing alkylene oxide adduct and a fluorine type aliphatic polymer ester. As the silicone-type surfactants that have been placed in the market, there have been known "L-7001", "L-2002" and "1-7604" manufactured by Nihon Unicar Co. As the fluorine type surfactants that have been placed in the market, there have been known "FZ-2123" manufactured by Nihon Unicar Co., "Megafac F-470", "Megafac F-1405" and "Megafac F-479" manufactured by Dainippon Ink Kagaku Co., and "Flowrad FC-430" manufactured by Sumitomo 3M Co.

The above surfactants can, usually, be used in one kind or being mixed together in two or more kinds. The surfactant is added in an amount, desirably, in a range of 0.01 to 1 part by mass per the total amount of the fine granular silica (a) and the organosilicon compound components (b) of 100 parts by weight.

In the present invention, the above-mentioned various additives are used in suitable amounts depending upon the object but are, usually, used in such amounts that the total amount of the fine granular silica (a) and the organosilicon compound components (b) in the coating composition is maintained to be not less than 95% by mass and, particularly, not less than 97% by mass calculated as solid components.

The coating composition of the present invention can be easily prepared by homogeneously mixing the above-mentioned components together. Generally, however, it is desired that the fine granular silica in a dispersion medium of water or an organic solvent is mixed together with the organosilicon compounds such as epoxy group-containing organosilicon compound and tetraalkoxysilane and with the curing catalyst just before the use. Generally, further, it is desired that the coating composition is preserved at about −30 to 20° C. when it is to be preserved for extended periods of time.

The coating composition is applied onto the surfaces of a predetermined optical base member and is cured to form a transparent and hard coating having excellent scratch resistance and favorably adhering to the optical base member. The curing is effected by being heated for a suitable period of time to a degree that will not deteriorate the optical base member to thereby volatilize the organic solvent and water contained in the coating composition.

<Hard Coating>

The hard coating has a thickness of, usually, about 1 to about 10 μm when it is formed on the surface of, for example, a plastic lens though it may vary depending upon the use of the optical base member.

Further, the hard coating formed by using the coating composition of the invention is very dense and its molecular motion is very limited. For example, the hard coating (cured body) has a glass transition point (Tg) of not lower than 150° C., particularly, not lower than 155° C. and, most desirably, not lower than 160° C. but the upper limit of the glass transition point is not higher than 200° C. Here, the glass transition point is measured by the differential scanning calorimetric analysis as will be described in Examples appearing later.

The hard coating is very dense and in which the fine granular silica (a) is homogeneously dispersed and is strongly fixed, and, therefore, has a very high hardness. When the hard coating is formed, for example, on the surface of the photochromic optical base member produced by the coating method (i.e., formed on the surface of the photochromic coating), the Bayer value can be increased to not smaller than 5 and, particularly, not smaller than 6.

The Bayer value is an index for evaluating the scratch resistance on the surface of a lens, and is for finding a haze of when the surface of the lens is scratched under a predetermined condition in comparison with that of a standard lens (photochromic coating in this case). The hard coating is evaluated to be hard and is little subject to be scratched if the Bayer value is not smaller than 4 and is evaluated to possess scratch resistance comparable to that of a glass if the Bayer value is not smaller than 6.

As will be understood from the above glass transition point and the Bayer value, the coating composition of the present invention is very dense, hard and has excellent scratch resistance. Besides, owing to these properties, the coating composition of the invention exhibits good barrier property against oxygen and suppresses the migration of photochromic compound from the photochromic layer that contains the photochromic compound at a high concentration. Therefore, the hard coating becomes the most effective when it is formed on the surface of the photochromic optical base member formed by the coating method. The hard coating effectively prevents the yellow deterioration stemming from the deteriorated photochromic compound due to the permeation of oxygen and effectively prevents the red deterioration stemming from the interaction between the amino group-containing photochromic compound and the components in the hard coating.

When a hard coating is formed by using the coating composition of the invention on the surface of the photochromic optical base member that is formed by the coating method, the degree of yellow deterioration ($\Delta YI$) thereof can be evaluated by, for example, a deterioration acceleration testing. As described in Examples appearing later, the deterioration acceleration testing is conducted by using a xenon arc lamp of 2.5 kW as a source of light and by irradiating light under the conditions of an irradiation intensity of 40 $W/m^2$ and an irradiated surface temperature of 50° C. for 100 hours. In this case, the degree of yellow deterioration ($\Delta YI$) is not larger than 3.5, from which it is learned that the yellow deterioration is effectively suppressed.

Further, the hard coating that is formed on the surface of the photochromic optical base member effectively suppresses the interaction between the photochromic compound and the catalyst component and, therefore, effectively prevents poor curing.

<Application to the Photochromic Optical Base Member>

As described above, the coating composition of the present invention becomes most effective when it forms a hard coating by being applied onto the photochromic optical base member that is forming a photochromic coating by the coating layer. FIG. 1 illustrates a sectional structure of a photochromic optical article (e.g., photochromic lens) having the hard coating formed thereon.

Referring to FIG. 1, the photochromic optical article generally designated at 10 has a hard coating 4 laminated on a photochromic optical base member (e.g., photochromic lens) which comprises a light-transmitting member 1 such as a plastic lens and a photochromic coating 3 formed thereon.

A suitable primer layer 2 is provided between the light-transmitting member 1 and the photochromic coating 3 to improve the adhesion between them. Further, an anti-reflection layer 5 may be provided on the hard coating 4. Though simply illustrated in FIG. 1, the anti-reflection layer 5 is, usually, a laminate of a plurality of thin inorganic layers having different indexes of reflection, and is formed by depositing thin layers of metal oxides such as $SiO_2$, $TiO_2$ and $ZrO_2$ or by applying thin layers of organic high molecular materials. Shock resistant primers such as urethane primers may be applied among the anti-reflection layers 5. Moreover, treatments such as antistatic treatment, water-repelling treatment and anti-fogging treatment as well as a secondary treatment may be effected on the anti-reflection layer 5. Further, though not shown, the hard coating 4 and the anti-reflection layer 5 may often be formed on the back surface of the light-transmitting member 1.

In the present invention, the hard coating 4 is formed by using the coating composition described above. The hard coating 4 formed on an ordinary spectacle lens without photochromic property is the one that is directly formed on the spectacle lens (plastic lens) which has neither the photochromic layer 3 nor the primer layer 2.

In FIG. 1, the light-transmitting member 1 may be a known optical member such as a spectacle lens or a windowpane of a house or an automobile without any particular limitation but is, particularly desirably, a spectacle lens.

The spectacle lenses may include known plastic spectacle lenses made from (meth)acrylic resin, polycarbonate resin, allyl resin, thiourethane resin, urethane resin and thioepoxy resin, as well as glass spectacle lenses. In the present invention, all of these spectacle lenses can be used without limitation. Particularly, it is desired to use plastic spectacle lenses made from (meth)acrylic resin, polycarbonate resin, allyl resin, thiourethane resin, urethane resin and thioepoxy resin.

The plastic spectacle lenses, usually, have curved surfaces. Owing to the recent advance in the optical design, further, the convex surfaces, in many cases, have curved surfaces of complex shapes. According to the present invention, such spectacle lenses can be used as the light-transmitting member 1 for forming the photochromic layer 3 and the hard coating 4 without any problem. The light-transmitting member 1 may have a thickness that varies depending upon the use without any limitation. Here, however, the spectacle lens has a thickness of about 1 to about 200 mm.

The surface of the light-transmitting member 1 may be treated in various ways. The surface treatment may be, for example, a chemical treatment using a basic aqueous solution or an acidic aqueous solution, a polishing treatment using a polishing agent, a plasma treatment using an atmospheric plasma and a low-pressure plasma, or a corona discharge treatment.

The primer layer 2 for improving the adhesion to the photochromic coating 3 (called photochromic layer) can be formed by using various primer resins. From the standpoint of adhesion to the photochromic layer 3, however, the urethane primer resin is particularly preferably used. The urethane primer resin has been closely described in a leaflet of International Laid-Open WO2004/078476. Though there is no particular limitation, the primer layer has a thickness of, usually, about 1 to about 10 μm.

The hard coating 4 is formed on the photochromic layer 3 by applying the above-mentioned composition followed by curing. Upon coating the photochromic layer 3 with the hard coating 4, the photochromic layer 3 exhibits improved scratch resistance and weather-proof property.

The photochromic layer 3 is formed by applying a curable composition (hereinafter referred to as photochromic curable composition) that contains a compound having photochromic property (photochromic compound), a radically polymerizable monomer and a polymerization initiator, followed by curing and has a thickness of, usually, about 5 to about 100 μm.

Unlike those photochromic optical base members obtained by the imbibition method and the in-mass method, the photochromic optical base member forming the photochromic layer 3 imparts photochromic property relying on the thin photochromic layer 3 which contains the photochromic compound at a high concentration. The problem of yellow deterioration occurs when the hard coating 4 is formed on the photochromic layer 3. However, the hard coating 4 formed by using the coating composition of the present invention makes it possible to prevent the yellow deterioration.

As the photochromic compound, a chromene compound is favorably used since it is capable of exhibiting a high degree of photochromic property with a thin photochromic layer 3. Among the chromene compounds, a chromene derivative having an amino group as a functional group (amino group-containing photochromic compound) is most desirably used since it excellently develops color and has its color quickly faded. When the hard coating 4 is formed on the photochromic layer 3 that is formed by using the amino group-containing photochromic compound, a problem arouses such as red deterioration or poor curing presumably due to the interaction between the photochromic compound present at a high concentration and the fine granular silica present in the hard coating 4. When the hard coating 4 is formed by using the coating composition of the present invention, however, the problem of red deterioration and poor curing can be effectively prevented.

As described above, the coating composition of the present invention exhibits its greatest effect when the hard coating 4 is to be formed on the photochromic layer 3 that is formed by using the amino group-containing photochromic compound.

When the photochromic layer is to be formed by using the amino group-containing photochromic compound, the compounds may be used in a single kind or being mixed together in two or more kinds. Or, the color tone may be adjusted by further using any other photochromic compounds (e.g., chromene compounds without amino group) in combination. In general, however, the ratio of the amino group-containing photochromic compound present in the photochromic curing composition is in a range of, desirably, 0.1 to 10.0% by mass from the standpoint of being homogeneously dispersed in the photochromic layer 3 though it may vary depending upon the thickness of the photochromic layer 3. Particularly, the amino group-containing photochromic compound is used in an amount in a range of 0.2 to 5.0% by mass when the photochromic layer 3 is to be formed maintaining a thickness of 20 μm to 50 μm and in a range of 0.3 to 3.0% by mass when the photochromic layer 3 is to be formed maintaining a thickness of 30 μm to 40 μm.

Amino Group-Containing Photochromic Compounds:

The amino group possessed by the amino group-containing photochromic compound may be have basic property, such as a group represented by —$NH_2$, —NHX or —$NX_2$ (X: substituent). Generally, however, it is desired to use a substituted amino group having a substituent X from the standpoint of obtaining excellent photochromic property.

It is further desired that the substituent X is a hydrocarbon group (e.g., alkyl group, aryl group) having 1 to 10 carbon atoms and, particularly, 1 to 7 carbon atoms from the standpoint of easy synthesis. Further, a heterocyclic group may be formed including, as hetero atoms, nitrogen atoms that are constituting the amino group with two substituents X being bonded thereto. In this case, it is desired that the heterocyclic group has carbon atoms in a number within the above-mentioned range. It is further desired that the number of the hetero atoms in the heterocyclic group is not larger than 4.

Preferred and concrete examples of the substituted amino group include dialkylamino groups having an alkyl group with 1 to 5 carbon atoms, such as dimethylamino group, diethylamino group and dibutylamino group; diphenylamino group; phenylmethylamino group; bis(2-hydroxyethyl) amino group; bis(2-methoxyethyl)amino group; morpholino group; piperidino group; hexamethyleneimino group; thiomorpholino group; pyrrole group; tetrahydroquinolyl group; piperadino group; N-methylpiperadino group; 1-pyrrolidinyl group; 2-quinolyl group; pyrazolidine group; quinuclidine group; indole group; indolinyl group; and carbazole group.

A representative example of the photochromic compound having the above substituted amino group is a chromene compound having a molecular weight of not larger than 540 represented by the following general formula (6).

Chromene Compound of the General Formula (6):

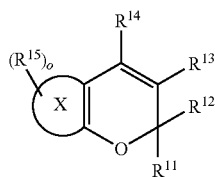

(6)

wherein at least any one of the groups $R^{11}$ to $R^{15}$ is an organic group having the above-mentioned substituted amino group.

In the above general formula (6), the ring X continuous to the pyran ring and having the group $R^{15}$ is an aromatic hydrocarbon ring or an unsaturated heterocyclic ring.

As the aromatic hydrocarbon ring, there can be exemplified rings having 6 to 20 carbon atoms, such as benzene ring, naphthalene ring, indenonaphthalene ring, phenanthrene ring and fluorene ring.

As the unsaturated heterocyclic ring, further, there can be exemplified rings having 4 to 20 carbon atoms and including one or two nitrogen atoms, oxygen atoms or sulfur atoms as hetero atoms, such as thiophene ring, benzothiophene ring, benzofuran ring, indole ring, quinoline ring, carbazole ring and phenanthridine ring.

Further, $R^{11}$ to $R^{15}$ can be the following groups on condition that at least one of them is an organic group having the above-mentioned substituted amino group.

First, "o" representing the number of the groups $R^{15}$ possessed by the ring X is an integer of 0 to 6, and the group $R^{15}$ is any one of the following groups "A".

Groups "A":
alkyl group having 1 to 8 carbon atoms;
alkyloxy group having 1 to 8 carbon atoms;
aryloxy group having 5 to 10 carbon atoms;
unsubstituted amino group;
substituted amino group having any one of alkyl group with 1 to 10 carbon atoms, aryl group with 6 to 10 carbon atoms, acyl group with 1 to 9 carbon atoms or fluorine atom as a substituent;
cyano group;
aryl group of which the ring has 6 to 10 carbon atoms;
a halogen atom such as fluorine atom or chlorine atom;
perfluoroalkyl group having 1 to 4 carbon atoms;
perfluoroalkyloxy group having 1 to 4 carbon atoms;
acyl group having 2 to 9 carbon atoms;
alkoxycarbonyl group having 2 to 9 carbon atoms;
aryloxycarbonyl group having 7 to 11 carbon atoms;
arylalkyl group having 7 to 18 carbon atoms;
hydroxyl group;
amide group;
N-substituted amide group substituted with a hydrocarbon group having 1 to 8 carbon atoms;
alkenyl group having 1 to 8 carbon atoms;
heterocyclic group having a nitrogen atom as a hetero atom and bonded to the ring X via the nitrogen atom, such as 1-pyrrolidinyl, piperidino, morpholino, 2-quinolyl, pyrazolidine, quinuclidine, indole, indoline and carbazole.

Among the groups "A" exemplified above, the aryl group, alkinyl group and heterocyclic group may have a substituent "B", respectively. Described below are concrete examples of the substituent "B".

Substituents "B"
alkyl group having 1 to 8 carbon atoms;
alkyloxy group having 1 to 8 carbon atoms;
amino group;
substituted amino group having an alkyl group with 1 to 10 carbon atoms as a substituent;
cyano group;
halogen atom such as fluorine atom or chlorine atom;
perfluoroalkyl group having 1 to 2 carbon atoms;
perfluoroalkyloxy group having 1 to 2 carbon atoms;
hydroxy group;
amide group;
acyl group having 2 to 9 carbon atoms;
alkoxycarbonyl group having 2 to 9 carbon atoms;
N-substituted amide group substituted with a hydrocarbon group having 1 to 8 carbon atoms;
heterocyclic group having a nitrogen atom as a hetero atom and bonded via the nitrogen atom, such as 1-pyrrolidinyl, piperidino and morpholino; and
condensed heterocyclic group in which the heterocyclic group is condensed with an aromatic hydrocarbon ring or an aromatic heterocyclic ring.

In the above general formula (6), further, $R^{11}$ and $R^{12}$ are, respectively, aromatic hydrocarbon groups, unsaturated heterocyclic groups, or groups represented by the following formula (6a) or (6b):

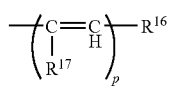

(6a)

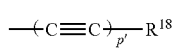

(6b)

wherein $R^{11}$ and $R^{12}$ may be bonded together to form an aliphatic hydrocarbon ring or an aromatic hydrocarbon ring.

As the aromatic hydrocarbon group, there can be exemplified phenyl group and naphthyl group. As the unsaturated heterocyclic group, there can be exemplified the group having 4 to 10 carbon atoms, such an furyl group, thienyl group, benzothienyl group, benzofuryl group, pyrrolyl group, indolyl group and triazinyl group.

These aromatic hydrocarbon group and unsaturated heterocyclic group may have a substituent. As the substituent, there can be exemplified those substituents "B" exemplified concerning the group $R^{15}$.

In the group of the formula (6a) or the formula (6b), $R^{16}$ and $R^{18}$ are the aromatic hydrocarbon groups or unsaturated heterocyclic groups exemplified above, $R^{17}$ is hydrogen atom, alkyl group having 1 to 8 carbon atoms (e.g., methyl group, ethyl group, butyl group, t-butyl group, isopropyl group, cyclopropyl group or cyclohexyl group) or halogen atom, and "p" and "p'" are integers of 1 to 3.

Further, the aliphatic hydrocarbon ring or the aromatic hydrocarbon ring formed by $R^{11}$ and $R^{12}$ together may be a hydrocarbon ring of a monocyclic structure having 6 to 20 carbon atoms constituting the ring, a condensed polycyclic hydrocarbon ring having 6 to 20 carbon atoms constituting the ring, or a crosslinked cyclic hydrocarbon ring. A fluorene ring, dihydroanthracene ring, cyclohexane ring, adamantane ring or indene ring may be spiro-bonded to the above rings.

In the present invention, it is desired that at least either $R^{11}$ or $R^{12}$ is an amino group-substituted aromatic hydrocarbon group or an amino group-substituted unsaturated heterocyclic group having the above-mentioned substituted amino group. Among them, the amino group-substituted phenyl group is particularly desired in which the substituted amino group is a mono- or dialkylamino group such as methylamino group, dimethylamino group or diethylamino group, and the substituted amino group is bonded to the $4^{th}$ position (p-position). That is, the chromene compound exhibits not only good photochromic properties but also the above-mentioned problem of red deterioration. The red deterioration, however, is effectively prevented when a hard coating is formed by using the coating composition of the present invention.

In the above general formula (6), further, $R^{13}$ and $R^{14}$ are the groups exemplified as the substituents "B" for the group $R^{15}$.

As described already, at least any one of the groups $R^{11}$ to $R^{16}$ in the above formula (6) is an amino group and, particularly, a group having a substituted amino group. Among the chromene compounds represented by the general formula (6), the compounds represented by the following formulas (7) to (12) are particularly desired from the standpoint of photochromic properties such as color density, fading rate and light resistance.

Compounds Represented by the Formula (7):

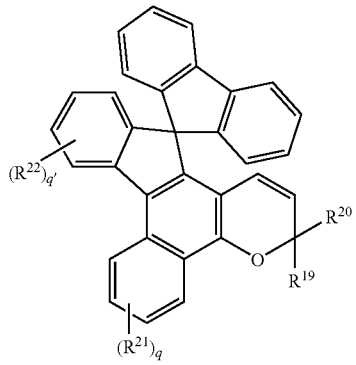

(7)

wherein,
$R^{19}$ and $R^{20}$ have the same meanings as $R^{11}$ and $R^{12}$ in the formula (6),
$R^{21}$ and $R^{22}$ have the same meaning as $R^{15}$ in the formula (6),
at least any one of $R^{19}$ to $R^{22}$ is a group having the above-mentioned amino group and, particularly, the substituted amino group, and
"q" and "q'" are, respectively, integers of 1 or 2.

Among the compounds represented by the above formula (7), a compound is particularly desired in which $R^{19}$ and/or $R^{20}$ are amino group-substituted aromatic hydrocarbon groups or amino group-substituted unsaturated heterocyclic groups.

Compounds Represented by the Formula (8):

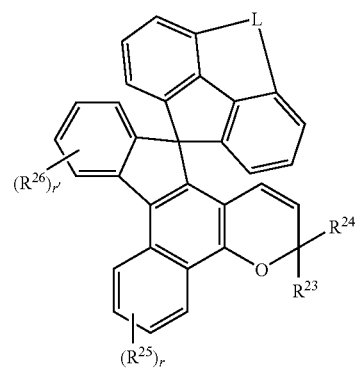

(8)

wherein
$R^{23}$ and $R^{24}$ have the same meanings as $R^{11}$ and $R^{12}$ in the formula (6),
$R^{25}$ and $R^{26}$ have the same meaning as $R^{15}$ in the formula (6),
at least any one of $R^{23}$ to $R^{26}$ is a group having the above-mentioned amino group and, particularly, the substituted amino group, r and r' are, respectively, 1 or 2, and L is a group represented by any one of the following formula,

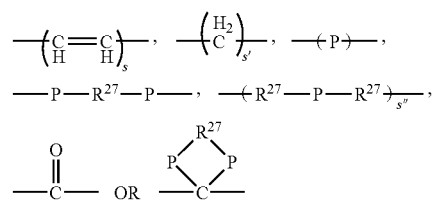

wherein "P" is an oxygen atom or a sulfur atom,
$R^{27}$ is an alkylene group having 1 to 6 carbon atoms,
and s, s' nd s" are integers of 1 to 4.

Among the compounds represented by the above formula (8), a compound is particularly desired in which $R^{23}$ and/or $R^{24}$ are amino group-substituted aromatic hydrocarbon groups or amino group-substituted unsaturated heterocyclic groups.

Compounds Represented by the Formula (9):

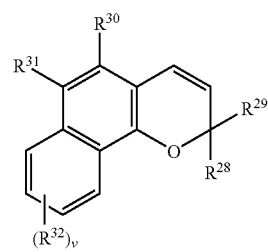

(9)

wherein,
$R^{28}$ and $R^{29}$ have the same meanings as $R^{11}$ and $R^{12}$ in the formula (6),
$R^{30}$, $R^{31}$ and $R^{32}$ have the same meaning as $R^{15}$ in the formula (6), at least any one of $R^{28}$ to $R^{32}$ is a group having the above-mentioned amino group and, particularly, the substituted amino group, and v is 1 or 2.

Among the compounds represented by the above formula (9), a compound is particularly desired in which $R^{28}$ and/or $R^{29}$ are amino group-substituted aromatic hydrocarbon groups or amino group-substituted unsaturated heterocyclic groups.

Compounds Represented by the Formula (10):

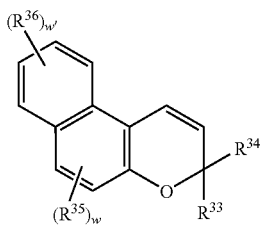

(10)

wherein,
$R^{33}$ and $R^{34}$ have the same meanings as $R^{11}$ and $R^{12}$ in the formula (6),
$R^{35}$ and $R^{36}$ have the same meaning as $R^{15}$ in the formula (6),
at least any one of $R^{33}$ to $R^{36}$ is a group having the above-mentioned amino group and, particularly, the substituted amino group, and
w and w' are, respectively, 1 or 2.

Among the compounds represented by the above formula (10), a compound is particularly desired in which $R^{33}$ and/or $R^{34}$ are amino group-substituted aromatic hydrocarbon groups or amino group-substituted unsaturated heterocyclic groups.

Compounds Represented by the Formula (11):

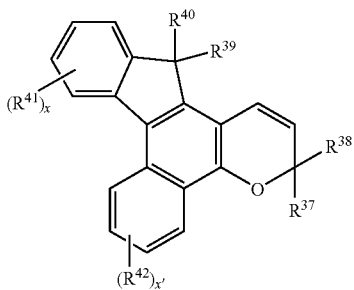

(11)

wherein,
$R^{37}$ and $R^{38}$ have the same meanings as $R^{11}$ and $R^{12}$ in the formula (6),
$R^{39}$, $R^{40}$, $R^{41}$ and $R^{42}$ have the same meaning as $R^{15}$ in the formula (6),
at least any one of $R^{37}$ to $R^{42}$ is a group having the above-mentioned amino group and, particularly, the substituted amino group, and
x and x' are, respectively, 1 or 2.

Among the compounds represented by the above formula (11), a compound is particularly desired in which $R^{37}$ and/or $R^{38}$ are amino group-substituted aromatic hydrocarbon groups or amino group-substituted unsaturated heterocyclic groups.

Compounds Represented by the Formula (12):

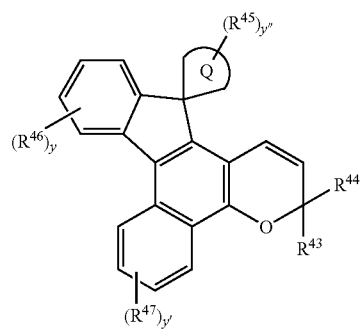

(12)

wherein,
$R^{43}$ and $R^{44}$ have the same meanings as $R^{11}$ and $R^{12}$ in the formula (6),
$R^{45}$, $R^{46}$ and $R^{47}$ have the same meaning as $R^{15}$ in the formula (6),
at least any one of $R^{43}$ to $R^{47}$ is a group having the above-mentioned amino group and, particularly, the substituted amino group,
a ring Q is an aliphatic hydrocarbon ring, and
y, y' and y" are, respectively, 1 or 2.

Among the compounds represented by the above formula (12), a compound is particularly desired in which $R^{43}$ and/or $R^{44}$ are amino group-substituted aromatic hydrocarbon groups or amino group-substituted unsaturated heterocyclic groups.

Among the amino group-substituted chromene compounds represented by the above formulas (7) to (12), the present invention particularly preferably uses the chromene compounds having a dialkylamino group such as dimethylamino group as exemplified below from the standpoint of photochromic properties.

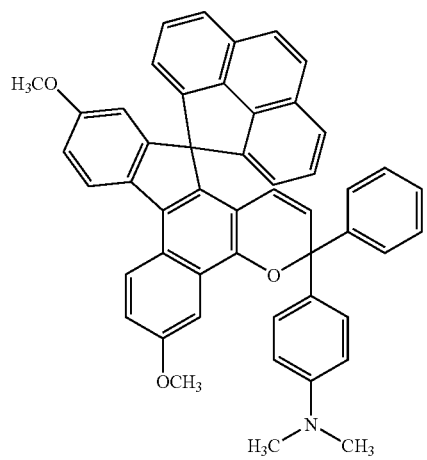

-continued

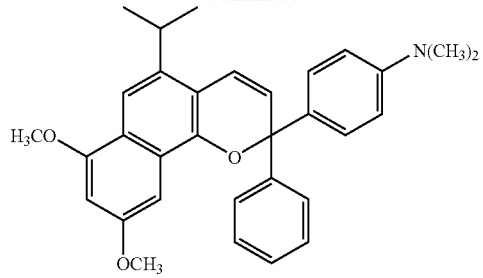
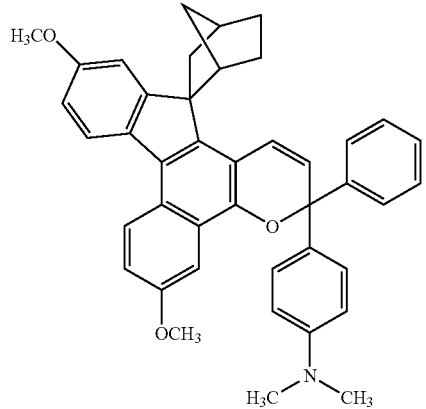
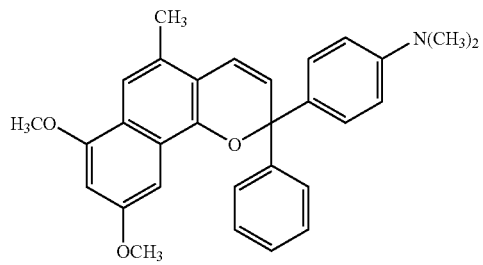
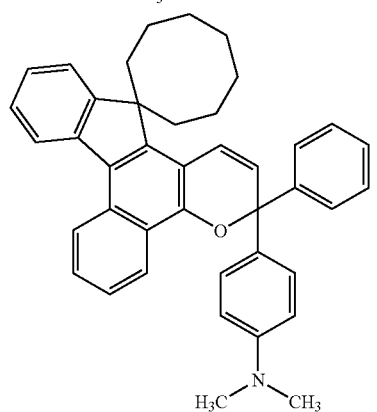
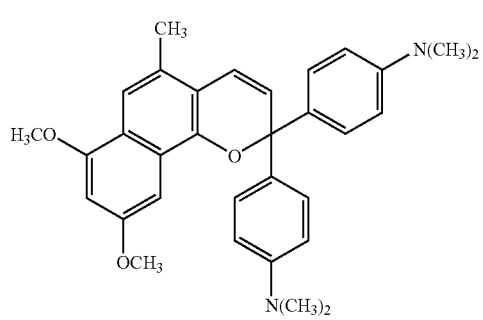

-continued

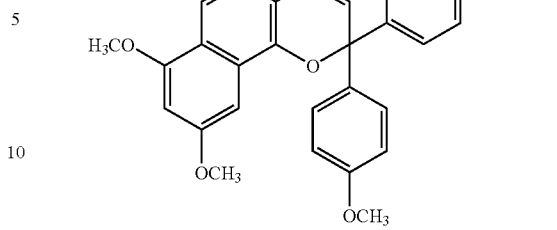
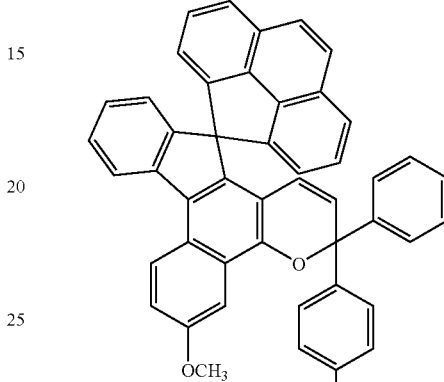
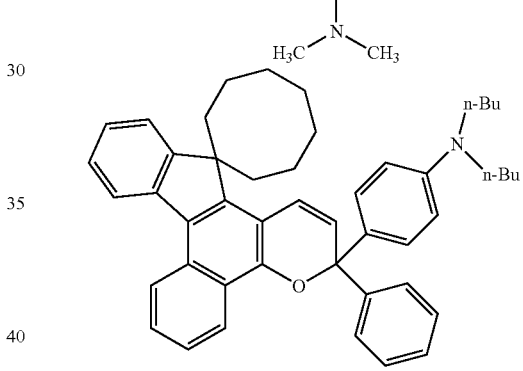

The above-mentioned amino group-containing chromene compounds may be used in one kind or in a mixture of two or more kinds. From the standpoint of obtaining very excellent photochromic properties yet effectively preventing the red deterioration caused by the hard coating formed by using the coating composition of the present invention, however, it is desired to use a chromene compound having a dialkylamino group in combination with a chromene compound having a substituted amino group other than the dialkylamino group among the above-mentioned chromene compounds having the amino group. When the amino group-containing photochromic compound (chromene compound) is used in combination as described above, the total content thereof is desirably in the above-mentioned range, i.e., 0.1 to 10.0% by mass per the curable composition. It is further desired that the mass ratio (C1/C2) of the chromene compound (C1) having the dialkylamino group and the chromene compound (C2) having an amino group other than the dialkylamino group is in a range of 0.0 to 5.0.

It was mentioned already that the above amino group-containing photochromic compound may be blended in the photochromic coating 3 (photochromic curable composition) in combination with the photochromic compound without having the above amino group. Known examples of the other photochromic compound may include fulgimide compound, spirooxazine compound and chromene compound.

As the fulgimide compound, spirooxazine compound and chromene compound, there can be preferably used those compounds that are disclosed in, for example, JP-A-2-28154, JP-A-62-288830, leaflet of WO94/22850 and leaflet of WO96/14596.

In addition to the above compounds, there can be further used those compounds having excellent photochromic properties that are disclosed in JP-A-2001-114775, JP-A-2001-031670, JP-A-200-011067, JP-A-2001-011066, JP-A-2000-347346, JP-A-2000-344762, JP-A-2000-344761, JP-A-2000-327676, JP-A-2000-327675, JP-A-2000-256347, JP-A-2000-229976, JP-A-2000-229975, JP-A-2000-229974, JP-A-2000-229973, JP-A-2000-229972, JP-A-2000-219678, JP-A-2000-219686, JP-A-2000-219685, JP-A-11-322739, JP-A-11-286484, JP-A-11-279171, JP-A-10-298176, JP-A-09-218301, JP-A-09-124645, JP-A-08-295690, JP-A-08-176139, JP-A-08-157467, U.S. Pat. No. 5,645,767, U.S. Pat. No. 5,961,892 and U.S. Pat. No. 6,296,785.

Among these other photochormic compounds, the chromene-type photochromic compounds exhibit photochromic properties maintaining higher light resistance than the other photochromic compounds, as well as excellent color density and fading rate and can, therefore, be used in combination with the above-mentioned amino group-containing chromene compound. Among the chromene-type photochromic compounds, further, the compounds having molecular weights of not smaller than 540 exhibit particularly excellent color density and fading rate, and are desirable. As the other chromene compounds, there can be exemplified the chromene compounds of the above formulas (7) to (12) without having amino group. The photochromic compounds without amino group can be used alone or being mixed together in two or more kinds.

When the amino group-containing photochromic compound (chromene compound) is used in combination with the other photochromic compounds, it is desired that the content of the other photochromic compounds is 0.01 to 5% by mass in the photochromic curable composition. The photochromic coating 3 has a thickness in a range of 5 to 100 μm. Within this range of thickness, the other photochromic compounds work to impart photochromic properties to a sufficient degree when used in the above-mentioned amount in combination with the amino group-containing photochromic compound.

Forming the Phorochromic Layer 3:

The photochromic layer 3 containing the amino group-containing photochromic compound is formed by applying a photochromic curable composition containing the amino group-containing photochromic compound and the other photochromic compound onto the transparent member 1 or the primer layer 2, followed by curing. As briefly described above, the photochromic curable composition is blended with a radically polymerizable monomer, a photo polymerization initiator and the like in addition to the photochromic compounds. The photochromic curable compositions (coating agents) have been closely described in the above-mentioned patent document (WO2003/011967) and patent document 5 (JP-A-2003-342310).

In order to improve the light resistance, color-developing rate, fading rate and formability of the photochromic compound, further, there can be added, to the photochromic curable composition, the additives such as surfactant (leveling agent) of the silicone type or fluorine type, antioxidant, radical-trapping agent, stabilizer against ultraviolet rays, ultraviolet ray absorber, releasing agent, anti-tinting agent, antistatic agent, fluorescent dye, dye, pigment, perfume, plasticizer, silane coupling agent and the like. It is further desired to blend a heat polymerization initiator. Details of the additives have been disclosed in, for example, the patent document 1.

It is desired that the content of the additives suitably used as described above is 1 to 20% by mass and, particularly, 1 to 10% by mass per the curable composition.

It is further desired that the photochromic curable composition used for forming the photochromic coating 3 has a viscosity (25° C.) of 20 to 500 cp, preferably, 50 to 200 cp and, most preferably, 60 to 200 cp. By adjusting the viscosity of the photochromic curable composition to lie in the above range, it becomes easy to form the photochromic coating 3 maintaining a thickness which is rather as large as 5 to 100 μm so as to exhibit photochromic properties to a sufficient degree.

The photochromic curing composition which is the coating agent can be applied by a known method such as spin coating, spray coating, dip coating or dip-spin coating without any limitation. In particular, the spin coating can be preferably employed to form a uniform coating with ease. There is no particular limitation either on the method of curing the curable composition. Desirably, a photochromic curing composition blended with a photo polymerization initiator and a heat polymerization initiator is used and is cured by being irradiated with ultraviolet rays or the like rays, followed by heating to complete the polymerization.

When the curing is effected by the irradiation with light such as ultraviolet rays, a known source of light can be used without any limitation. Concrete examples of the source of light include ultra-high pressure mercury lamp, high pressure mercury lamp, low pressure mercury lamp, xenon lamp, carbon arc, sterilizing lamp, metal halide lamp, and electrodeless lamp. The time for irradiating light by using the above source of light may be suitably determined depending upon the kind of the photo polymerization initiator blended in the photochromic curable composition, absorption wavelength and sensitivity, and thickness of the photochromic layer 3. Further, an electron ray can be used as a source of light. In this case, the photochromic layer 3 is formed by curing the curable composition without adding the photo polymerization initiator thereto. The curing by the irradiation with light or electron ray makes it possible to instantaneously form the photochromic layer 3 offering such advantages as increasing the hardness of the surface and improving the scratch resistance.

The photochromic layer 3 formed as described above has a Vickers' hardness which, usually, lies in a range of 0.3 to 10 kg/mm$^2$ and is relatively soft and its scratch resistance must be increased. Therefore, a hard coating 4 is formed.

Forming the Hard Coating 4:

The hard coating 4 is formed having a thickness of about 1 to about 10 μm by applying the coating composition of the invention and curing it. The coating composition is applied by a known method such as spin coating, spray coating, dip coating or dip-spin coating. The coating composition after applied is cured depending upon the kinds of the base members such as the photochromic layer 3 and the transparent member 1 by heating for a suitable period of time to such a degree that these base members are not deteriorated. Usually, it is desired that the coating composition is cured by being heated at not lower than 70° C. for not less than 15 minutes, preferably, at not lower than 90° C. for not less than 30 minutes and, most preferably, at not lower than 100° C. for not less than one hour.

The hard coating 4 formed as described above is very dense, has a high glass transition point as described above, adheres excellently to the photochromic layer 3, has a Bayer value of not less than 4 and, particularly, not less than 6, has a high scratch resistance, and serves as a protection layer for the photochromic layer 3.

The hard coating 4 that is formed effectively prevents inconvenience specific to the photochromic optical base member having photochromic layer 3, such as yellow deterioration or red deterioration and, further, effectively prevents poor curing in forming the hard coating 4.

EXAMPLES

The invention will now be described with reference to Examples and Comparative Examples to which only, however, the invention is in no way limited.

Described below are the lens base members used in Examples, components used for forming the coating composition and components used for forming the photochromic layer.

(1) Lens Base Members.
CR: Allyl resin plastic lens, refractive index=1.50.
MRA: Thiourethane resin plastic lens, refractive index=1.60.
MRB: Thiourethane resin plastic lens, refractive index=1.67.
POL: Polycarbonate resin plastic lens, refractive index=1.59.

(2) Components for the Coating Composition.
[Ultrafine Silica Having a Grain Size of not Larger than 7 nm]
SOL1: Fine silica particles dispersed in water.
Snowtex OXS manufactured by Nissan Kagaku Kogyo Co.
Solid component concentration; 10% by mass.
Primary particle size of the silica; 4 to 7 nm.
pH=2 to 4.

[Fine Silica Having a Grain Size of Larger than 7 nm but not Larger than 30 nm]
SOL2: Silica sol dispersed in methanol, manufactured by Nissan Kagaku Kogyo Co.
Solid component concentration; 30% by weight.
Primary particle size of the silica; 10 to 20 nm.
pH=2 to 4.
SOL3: Fine silica particles dispersed in water.
Snowtex O manufactured by Nissan Kagaku Kogyo Co.
Solid component concentration; 20% by mass.
Primary particle size of the silica; 10 to 15 nm.
pH=2 to 4.
SOL4: Fine silica particles dispersed in water.
Snowtex OS manufactured by Nissan Kagaku Kogyo Co.
Solid component concentration; 20% by mass.
Primary particle size of the silica; 8 to 11 nm.
pH=2 to 4.
SOL5: Fine silica particles dispersed in water.
Snowtex O-40 manufactured by Nissan Kagaku Kogyo Co.
Solid component concentration; 40% by mass.
Primary particle size of the silica; 20 to 28 nm.
pH=2 to 4.

[Fine Silica Having a Grain Size of Larger than 30 nm]
SOL6: Silica sol dispersed in isopropanol, manufactured by Nissan Kagaku Kogyo Co.
Solid component concentration; 30% by mass.
Primary particle size of the silica; 40 to 50 nm.
pH=2 to 4.

The primary particle size (diameter) of the fine silica was measured for their diameters in a manner as described below.

That is, the dispersion solution of the fine silica was diluted with ultra-pure water so that the solid component concentration was 0.1% by mass. The obtained diluted solution was dropped in very small amounts onto a mesh with a collodion membrane manufactured by Nihon Denshi Datum Co., dried at room temperature for half a day, and was measured by using an electron microscope (TEM; electron radiation-type transmission microscope, Tecnai F20, manufactured by Philips Electron Optics Co.) at an acceleration voltage of 200 kV and a drawing voltage of 4.2 kV.

[Organosilicon Compound Components]
Epoxy Group-Containing Silane (b1)
GTS: γ-glycidoxypropyltrimethoxysilane
GDS: γ-glycidoxypropylmethyldimethoxysilane
Tetraalkoxysilane (b2)
TEOS: tetraethoxysilane
TMOS: tetramethoxysilane
Other Silanes
MTEOS: methyltriethoxysilane
HTS: n-hexyltrimethoxysilane

[Water-Soluble Organic Solvents]
MeOH: methanol
TBA: t-butanol
IPA: isopropyl alcohol
EGPE: ethylene glycol monoisopropyl ether
EGEE: ethylene glycol monoethyl ether
EGBE: ethylene glycol mono-t-butyl ether
PGPE: propylene glycol mono-n-propyl ether
AcAc: acetylacetone
DAA: diacetone alcohol

[Curing Catalysts]
Complex Containing Aluminum as a Core Metal
C1: tris(2,4-pentanedionato)aluminum(III)
Complex Containing Zinc as a Core Metal
C2: bis(2,4-pentanedionato)zinc(II)
Other Curable Catalyst
C3: ammonium perchlorate (3) Primer Component for Photochromic:
A moisture-curing primer "TAKESEAL PFR402TP-4" manufactured by Takabayashi Kagaku Kogyo Co.

(4) Photochromic Curable Composition Component (Photochromic Coating Component)
[Radically Polymerizable Monomers]
TMPT: trimethylolpropane trimethacrylate
EB6A: polyester oligomer hexaacrylate (EB1830 manufactured by Dycel UCB)
GMA: glycidyl methacrylate
9GDA: polyethylene glycol diacrylate (average molecular weight, 532)
BPEO: 2,2-bis(4-acryloyloxypolyethylene glycol phenyl) propane (average molecular weight, 776)
U6A: urethane oligomer hexaacrylate
BPE: 2,2-bis(4-methacryloyloxyethoxyphenyl)propane

[Photo Polymerization Initiators]
CGI1870:
A mixture of 1-hydroxycyclohexylphenyl ketone and bis(2,6-dimethoxybenzoyl)-2,4,4-trimethyl-pentylphosphineoxide (weight ratio, 3:7)
CGI1800:
A mixture of 1-hydroxycyclohexylphenyl ketone and bis(2,6-dimethoxybenzoyl)-2,4,4-trimethyl-pentylphosphineoxide (weight ratio, 3:1)

[Stabilizers]
LS765:
Bis(1,2,2,6,6-pentamethyl-4-piperidyl)sebacate
IRG245:
Ethylene bis(oxyethylene)bis[3-(5-tert-butyl-4-hydroxy-m-tollyl)propionate]
[Leveling Agents]
SiL1: silicone-type surfactant, L7001, manufactured by Toray-Dow Corning Co.
SiL2: silicone-type surfactant, FZ2104, manufactured by Toray-Dow Corning Co.
[Silane Coupling Agent]
TSL: γ-methacryloyloxypropyltrimethoxysilane
[Others]
NMDEA: N-methyldiethanolamine
[Photochromic Compounds]
PC1: Amino group-containing chromene compound of the following formula,

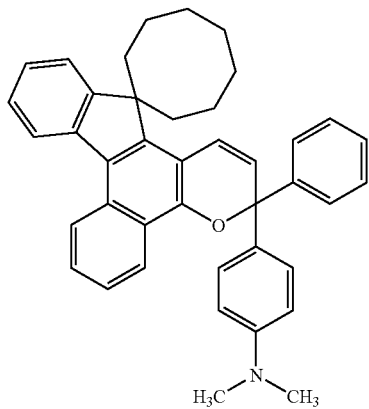 [SMILES: CN(C)c1ccc(C2(c3ccccc3)C=Cc3c4c(c5ccccc5c3O2)-c2ccccc2C42CCCCCCC2)cc1]

PC2: Amino group-containing chromene compound of the following formula,

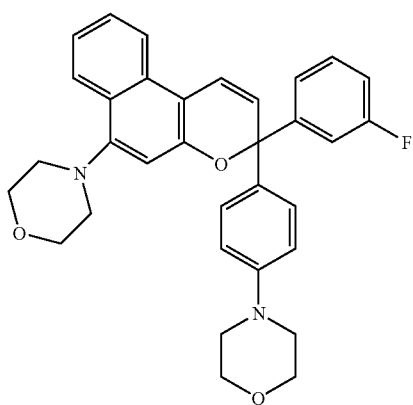 [SMILES: Fc1cccc(C2(c3ccc(N4CCOCC4)cc3)C=Cc3c(cc(N4CCOCC4)c4ccccc34)O2)c1]

PC3: Amino group-containing chromene compound of the following formula,

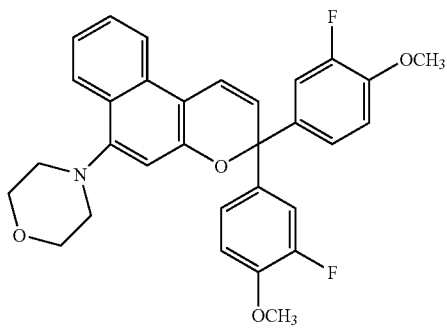 [SMILES: COc1ccc(C2(c3ccc(OC)c(F)c3)C=Cc3c(cc(N4CCOCC4)c4ccccc34)O2)cc1F]

PC4: Amino group-containing chromene compound of the following formula,

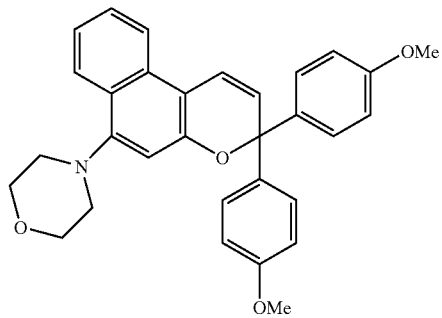 [SMILES: COc1ccc(C2(c3ccc(OC)cc3)C=Cc3c(cc(N4CCOCC4)c4ccccc34)O2)cc1]

PC5: Amino group-containing chromene compound of the following formula,

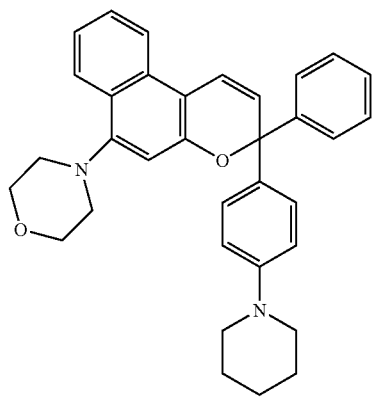 [SMILES: C1=CC(c2ccccc2)(c2ccc(N3CCCCC3)cc2)Oc2cc(N3CCOCC3)c3ccccc3c21]

PC6: Amino group-containing chromene compound of the following formula,

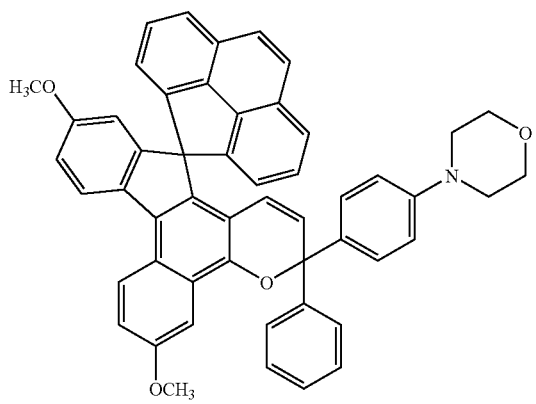 [SMILES: COc1ccc2c(c1)C1(c3c4c(c5cc(OC)ccc5c3-2)OC(c2ccccc2)(c2ccc(N3CCOCC3)cc2)C=C4)c2cccc3ccc4cccc1c4c23]

PC7: Amino group-containing chromene compound of the following formula,

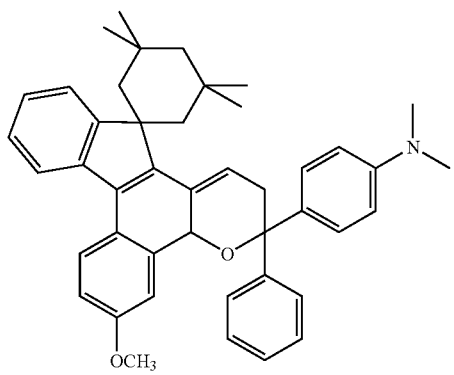 [SMILES: COc1ccc2c(c1)C1OC(c3ccccc3)(c3ccc(N(C)C)cc3)CC=C1C1=C2c2ccccc2C12CC(C)(C)CC(C)(C)C2]

PC8: Amino group-containing chromene compound of the following formula,

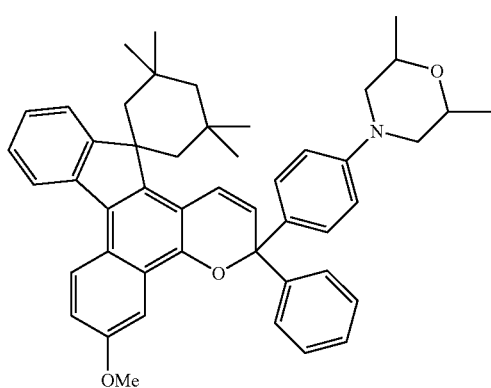 [SMILES: COc1ccc2c3c(c4c(c2c1)OC(c1ccccc1)(c1ccc(N2CC(C)OC(C)C2)cc1)C=C4)C1(CC(C)(C)CC(C)(C)C1)c1ccccc1-3]

PC9: Amino group-containing chromene compound of the following formula,

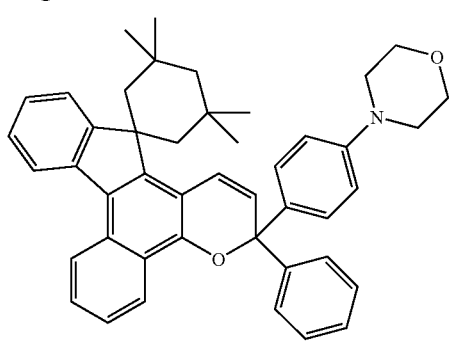

PC10: Amino group-containing chromene compound of the following formula,

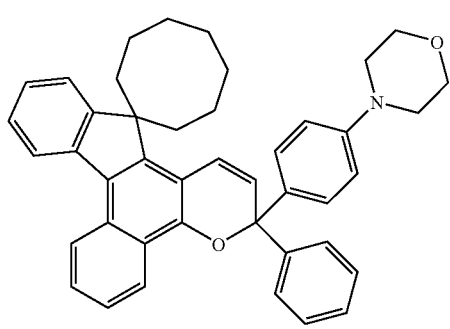 [SMILES: C1=CC(c2ccccc2)(c2ccc(N3CCOCC3)cc2)Oc2c1c1c(c3ccccc23)-c2ccccc2C12CCCCCCC2]

PC11: Amino group-containing chromene compound of the following formula,

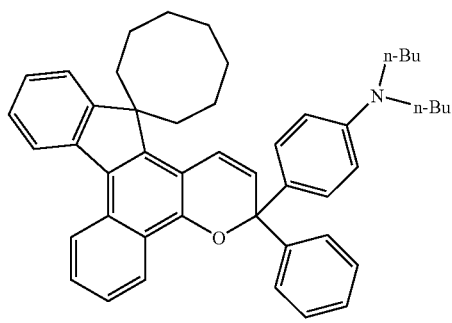

PC12: Amino group-containing chromene compound of the following formula,

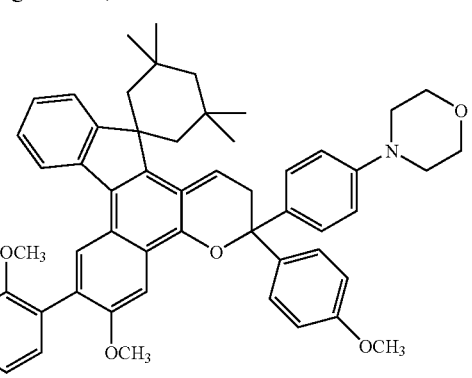

PC13: Amino group-containing chromene compound of the following formula,

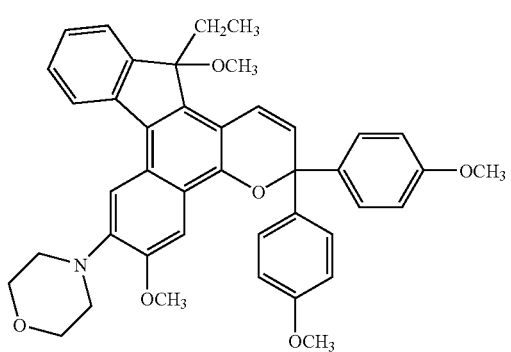 [SMILES: CCC1(OC)c2ccccc2-c2c1c1c(c3cc(OC)c(N4CCOCC4)cc23)OC(c2ccc(OC)cc2)(c2ccc(OC)cc2)C=C1]

PC14: Non-amino chromene compound of the following formula,

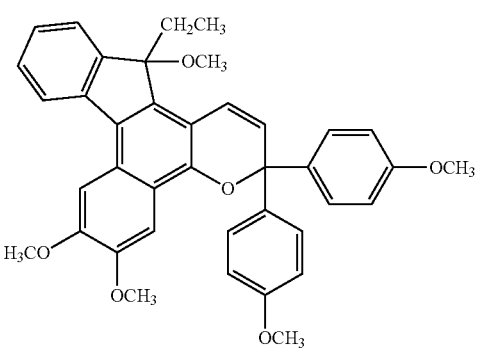 [SMILES: CCC1(OC)c2ccccc2-c2c1c1c(c3cc(OC)c(OC)cc23)OC(c2ccc(OC)cc2)(c2ccc(OC)cc2)C=C1]

<Measuring the Glass Transition Points (Tg)>

Cured bodies of coating compositions prepared below were measured for their glass transition points (Tg) by a method described below.

The prepared coating composition was heated in a container of an aluminum foil at 120° C. for one hour to obtain a cured body. The cured body was ground down into a powder, about 20 mg thereof was weighed in an aluminum pan installed in a differential scanning calorimeter, DSC 6200, manufactured by Seiko Instrument Co., and was subjected to the differential scanning calorimetric analysis (DSC) by using alumina as a reference in an argon atmosphere at a measuring temperature over a range of 0 to 300° C. by elevating the temperature at a rate of 20° C. per minute.

For the DSC curve obtained by the above measurement, an extrapolation line 1 was drawn along a base line before the start of phase transition (glass transition), an extrapolation line 2 was drawn along a line during the phase transition, and a point where the extrapolation line 1 and the extrapolation 2 intersect was calculated as a glass transition point.

<Preparation of Coating Compositions>

Coating Composition 1

The organosilicon compound and the organic solvent having the following recipes were mixed together and stirred to a sufficient degree.

Organosilicon Compound Components:

| γ-glycidoxypropyltrimethoxysilane (GTS) | 53.4 g |
| tetraethoxysilane (TEOS) | 21.8 g |
| n-hexyltrimethoxysilane (HTS) | 4.7 g |

Organic Solvents:

| methanol (MEOH) | 64.0 g |
| t-butyl alcohol (TBA) | 27.0 g |
| acetylacetone (AcAc) | 27.0 g |
| ethylene glycol monoisopropyl ether (EGPE) | 12.0 g |

To the above mixed solution were, next, added the following components:

| leveling agent, SiL1 (silicone surfactant) | 0.2 g |
| curing catalyst C1 (complex containing Al as a core metal) | 0.63 g |
| ultra-fine silica SOL1 (silica particles dispersed in water, primary particle size of not larger than 7 nm, solid component concentration of 10% by mass), | 189.0 g |

The mixture was matured a whole day and night to obtain a coating composition (1) of the present invention. The composition of the coating composition was as shown in Table 1. In Table 1, parts by mass of the components are reference parts by mass with the total amount of the fine granular silica and the organosilicon compound as 100 parts by mass.

The cured body of the coating composition was measured for its glass transition point (Tg) to be 163° C.

Coating Composition 2

To 189.0 g of the ultra-fine silica, SOL1 (having a primary particle size of not larger than 7 nm), was added 53.4 g of GTS (γ-glycidoxypropyltrimethoxysilane) as an organosilicon compound, and the mixture was stirred at room temperature for 6 hours.

Next, to the above mixed solution was added an organic solvent of the following recipe:

Organic Solvents:

| MEOH (methanol) | 68.6 g |
| TBA (t-butyl alcohol) | 27.55 g |
| (AcAc) acetylacetone | 27.55 g |
| EGPE (ethylene glycol monoisopropyl ether) | 12.2 g |

Next, to the above mixed solution were added;

| leveling agent, SiL1 (silicone surfactant) | 0.2 g |
| curing catalyst C1 (complex having Al as a core metal) | 0.63 g | and the mixture was stirred at room temperature for 30 minutes. Thereafter, 21.8 g of tetraethoxysilane (TEOS) was added as the organosilicon compound thereto, and the mixture was stirred at room temperature for 12 hours to maturity to obtain a coating composition (2) of the present invention. The composition of the coating composition and the glass transition point of the cured body thereof were as shown in Table 1.

Coating Composition 3

The fine silica, organosilicon compound components, organic solvent and leveling agent (surfactant) having the following recipes were mixed together and stirred at room temperature for 3 hours.

Fine Silica:

| SOL4 (silica dispersed in water, primary particle size of 8 to 11 nm, solid component concentration of 20% by mass) | 198.0 g |

Organosilicon Compound Components:

| GTS (γ-glycidoxypropyltrimethoxysilane) | 54.4 g |
| TEOS (tetraethoxysilane) | 15.3 g |

Organic Solvent:

| TBA (t-butyl alcohol) | 79.4 g |

Leveling Agent:

| SiL1 (silicone surfactant) | 0.44 g |

To the mixed solution obtained above were added the following components:

Organic Solvents:

| EGBE (ethylene glycol mono-t-butyl ether) | 13.2 g |
| DAA (diacetone alcohol) | 20.9 g |
| 0.05 N hydrochloric acid aqueous solution (used for hydrolyzing the organosilicon compound) | 17.8 g |

Curing Catalysts:

| C1 (complex using Al as a core metal) | 0.64 g |
| C2 (complex using Zn as a core metal) | 0.15 g | and the mixture was further stirred at room temperature for 20 hours to obtain a coating composition (3) of the invention.

The composition of the coating composition and the glass transition point of the cured body thereof were as shown in Table 1.

Coating Composition 4

To a mixed silica dispersion solution containing the fine silica of the following recipe and water, were added organosilicon compound components, organic solvents and leveling agents (surfactants), and the mixture was stirred at room temperature for 3 hours.

Mixed Silica Dispersion Solution:

| | |
|---|---|
| Ultra-fine silica SOL1 (silica dispersed in water, primary particle size of not larger than 7 nm, solid component concentration of 10% by mass) | 60.5 g |
| Fine silica SOL5 (silica dispersed in water, primary particle size of 20 to 28 nm, solid component concentration of 40% by mass) | 120.5 g |
| Water | 45.0 g |

Organosilicon Compound Components:

| | |
|---|---|
| GTS (γ-glycidoxypropyltrimethoxysilane) | 78.7 g |
| TEOS (tetraethoxysilane) | 21.5 g |

Organic Solvents:

| | |
|---|---|
| TBA (t-butyl alcohol) | 39.7 g |
| IPA (isopropyl alcohol) | 20.5 g |

Leveling Agent:

| | |
|---|---|
| SiL1 (silicone surfactant) | 0.40 g |

To the above mixed solution were, further, added the following components:

Organic Solvents:

| | |
|---|---|
| EGPE (ethylene glycol monoisopropyl ether) | 40.4 g |
| 0.05 N hydrochloric acid aqueous solution | 25.4 g |

Curing Catalyst:

| | |
|---|---|
| C1 (complex containing Al as a core metal) | 0.92 g | and the mixture was further stirred at room temperature for 20 hours to obtain a coating composition (4) of the invention. The composition of the coating composition and the glass transition point of the cured body thereof were as shown in Table 1.

Coating Composition 4'

A coating composition 4' having quite the same composition as that of the coating composition 4 was prepared according to a procedure described below.

The organosilicon compound components (78.7 g of GTS and 21.5 g of TEOS) were hydrolyzed by being reacted with 25.5 g of a 0.05 N hydrochloric acid aqueous solution and being cooled with water so that a maximum liquid temperature was maintained to be not higher than 40° C. A solution of the obtained hydrolyzed product of the organosilicon compound was added to a silica-mixed dispersion solution used for the preparation of the coating composition 4. Next, to the solution was added a mixture of organic solvents (39.7 g of TBA, 20.5 g of IPA and 40.4 g of EGPE), 0.40 g of a leveling agent (silicone surfactant, SiL1) and 0.92 g of a curing catalyst (C1), and the mixture was stirred at room temperature for 3 hours to obtain a coating composition 4'.

Coating Composition 4"

A coating composition 4" having quite the same composition as that of the coating composition 4 was prepared according to a procedure described below.

To the mixed silica dispersion solution used for the preparation of the coating composition 4 was added the following mixture:

| | |
|---|---|
| organosilicon compound component: | GTS 78.7 g |
| organic solvents: | TBA 39.7 g, IPA 20.5 g |
| leveling agent: | SiL1 (silicone surfactant) 0.40 g | and the mixture was stirred at room temperature for 2 hours. Further, 21.5 g of TEOS was added as an organosilicon compound component thereto, and the mixture was stirred at room temperature for another 2 hours. Next, to the solution was added a mixture of 40.4 g of an organic solvent (EGPE), 25.5 g of a 0.05 N hydrochloric acid aqueous solution and 0.92 g of a curing catalyst (C1), and the mixture was stirred at room temperature for 20 hours to obtain a coating composition 4".

Coating Compositions 5 and 6

Coating compositions were prepared by the same method as that of preparing the coating composition 3 but using the fine silica, organosilicon compounds, organic solvents, curing catalysts, acid aqueous solutions (for hydrolyzing the organosilane compound) and leveling agents (surfactant) shown in Table 1. The compositions of the obtained coating compositions and the glass transition points of the cured bodies thereof were as shown in Table 1.

Coating Compositions 7 to 11

Coating compositions were prepared by the same method as that of preparing the coating composition 4 but using the fine silica, organosilicon compounds, organic solvents, curing catalysts, acid aqueous solutions and leveling agents (surfactants) shown in Tables 1 and 2. The compositions of the obtained coating compositions and the glass transition points of the cured bodies thereof were as shown in Tables 1 and 2.

Coating Composition 12

A coating compositions was prepared by the same method as that of preparing the coating composition 3 but using the fine silica, organosilicon compound, organic solvent, curing catalyst, acid aqueous solution (for hydrolyzing the organosilane compound) and leveling agent (surfactant) shown in Table 2. The composition of the obtained coating composition and the glass transition point of the cured body thereof were as shown in Table 2.

Coating Composition 13

To a mixed dispersion solution containing a fine silica and an organic solvent, were added organosilicon compound components, organic solvents and leveling agents (surfactants), and the mixture was stirred at room temperature for 3 hours.

Mixed Dispersion Solution:

| | |
|---|---|
| Fine silica SOL5 (silica dispersed in water, primary particle size of 20 to 28 nm, solid component concentration of 40% by mass) | 115.6 g |

Organic Solvent;

| MeOH (methanol) | 115.6 g |
|---|---|

Organosilicon Compound Components:

| GTS (γ-glycidoxypropyltrimethoxysilane) | 44.8 g |
|---|---|
| TEOS (tetraethoxysilane) | 63.6 g |

Organic Solvent:

| TBA (t-butyl alcohol) | 13.5 g |
|---|---|

Leveling Agent:

| SiL1 (silicone surfactant) | 0.40 g |
|---|---|

To the above mixed solution were, further, added the following components:
Organic Solvent:

| EGBE (ethylene glycol mono-t-butyl ether) | 13.5 g |
|---|---|
| 0.05 N hydrochloric acid aqueous solution | 32.2 g |

Curing Catalyst:

| C1 (complex using Al as a core metal) | 0.72 g |
|---|---| and the mixture was further stirred at room temperature for 20 hours to obtain a coating composition (13) of the invention. The composition of the coating composition and the glass transition point of the cured body thereof were as shown in Table 2.

Comparative Coating Composition 14

A coating composition was prepared by the same method as that of preparing the coating composition 2 but using the fine silica, organosilicon compound, organic solvent, curing catalyst, acid aqueous solution and leveling agent (surfactant) shown in Table 2. The composition of the obtained coating composition and the glass transition point of the cured body thereof were as shown in Table 2.

Coating Composition 15

A coating composition was prepared by the same method as that of preparing the coating composition 4 but using the fine silica, organosilicon compound, organic solvent, curing catalyst, acid aqueous solution and leveling agent (surfactant) shown in Table 2. The composition of the obtained coating composition and the glass transition point of the cured body thereof were as shown in Table 2.

Coating Composition 16

To an aqueous silica dispersion solution containing an aqueous dispersion solution of fine silica and water, were added organosilicon compound components, organic solvents and leveling agents (surfactants), and the mixture was stirred at room temperature for 15 hours.

Aqueous Silica Dispersion Solution:

| Fine silica SOL5 (silica dispersed in water, primary particle size of 20 to 28 nm, solid component concentration of 40% by mass) | 72.0 g |
|---|---|
| Water | 36.0 g |

Organosilicon Compound Components:

| GTS (γ-glycidoxypropyltrimethoxysilane) | 69.2 g |
|---|---|
| TEOS (tetraethoxysilane) | 66.8 g |

To the mixed solution obtained above were added the following components:
Organic Solvents:

| TBA (t-butyl alcohol) | 60.0 g |
|---|---|
| AcAc (acetylacetone) | 18.0 g |
| MeOH (methanol) | 60.6 g |
| EGPE (ethylene glycol monoisopropyl ether) | 13.6 g |

Curing Catalyst:

| C1 (complex containing Al as a core metal) | 3.36 g |
|---|---|

Leveling Agent:

| SiL1 (silicone surfactant) | 0.40 g |
|---|---| and the mixture was further stirred at room temperature for 3 hours to obtain a coating composition (16) of the invention.

The composition of the coating composition and the glass transition point of the cured body thereof were as shown in Table 2.

Coating Compositions 17 and 18

Coating compositions 17 and 18 were prepared by the same method as that of preparing the coating composition 16 but using the fine silica, organosilicon compound, solvent, curing catalyst, aqueous solution used for the hydrolysis of the organosilane compound and surfactant shown in Table 2. The compositions of the obtained coating compositions and the glass transition points of the cured bodies thereof were as shown in Table 2.

Coating Composition 19

A coating composition 19 was prepared by the same method as that of preparing the coating composition 13 but using the fine silica, organosilicon compound, solvent, curing catalyst, aqueous solution used for the hydrolysis of the organosilane compound and surfactant shown in Table 2. The composition of the obtained coating composition and the glass transition point of the cured body thereof were as shown in Table 2.

Comparative Coating Compositions 1 to 10

Comparative coating compositions 1 to 10 were prepared by the same method as that of preparing the coating composition 1 but using the fine silica, organosilicon compounds, solvents, curing catalysts, aqueous solutions used for the hydrolysis of the organosilane compound and surfactants shown in Table 3. The compositions of the obtained coating compositions and the glass transition points of the cured bodies thereof were as shown in Table 3.

TABLE 1

| Coating Composition No. | Fine granular silica having grain size of not larger than 7 nm Ref. mass parts | Fine granular silica having grain size of 7 to 30 nm Ref. mass parts | Organosilicon compound (g) Ref. mass parts |
|---|---|---|---|
| Composition 1 | SOL1 189.0 19.1 | — | GTS 53.4/ TEOS 21.8/ HTS 4.7 54.0/22.1/4.8 |
| Composition 2 | SOL1 189.0 20.1 | — | GTS 53.4/ TEOS 21.8 56.7/23.2 |
| Composition 3 | — | SOL4 198.0 36.2 | GTS 54.4/ TEOS 15.3 49.8/14.0 |
| Composition 4 | SOL1 60.5 3.9 | SOL5 120.5 31.2 | GTS 78.7/ TEOS 21.5 51.0/13.9 |
| Composition 5 | SOL1 200.0 15.0 | SOL5 51.8 15.6 | GTS 57.8/ TEOS 34.6 43.4/26.0 |

| Coating Composition No. | Solvent (g) | Acid aq. sol. (g) | Water content (ref. mass parts) | Curing catalyst (g) | Surfactant (g) | Transition point (° C.) |
|---|---|---|---|---|---|---|
| Composition 1 | MeOH/TBA/AcAc/EGPE = 64.0/27.0/27.0/12.0 | — | 172 | C1 0.63 | SiL1 0.20 | 163 |
| Composition 2 | MeOH/TBA/AcAc/EGPE = 68.6/27.6/27.6/12.2 | — | 181 | C1 0.63 | SiL1 0.20 | 167 |
| Composition 3 | TBA/EGBE/DAA = 79.4/13.2/20.9 | 0.05 N HCl sol. 17.8 | 161 | C1/C2 0.64/0.15 | SiL1 0.44 | 168 |
| Composition 4 | TBA/IPA/EGPE/water = 39.7/20.5/40.4/45.0 | 0.05 N HCl sol. 25.4 | 128 | C1 0.92 | SiL1 0.40 | 167 |
| Composition 5 | TBA/PGPE = 14.7/14.7 | 0.05 N HCl sol. 25.2 | 177 | C1 0.8 | SiL1 0.40 | 170 |

| Coating Composition No. | Fine granular silica having grain size of not larger than 7 nm Ref. mass parts | Fine granular silica having grain size of 7 to 30 nm Ref. mass parts | Organosilicon compound (g) Ref. mass parts |
|---|---|---|---|
| Composition 6 | — | SOL4 231.2 29.9 | GTS 44.8/ TEOS 63.6 29.0/41.1 |
| Composition 7 | — | SOL2 154.2 29.9 | GTS 44.8/ TEOS 63.6 29.0/41.1 |
| Composition 8 | — | SOL5 130.6 37.9 | GTS 67.5/ TEOS 18.0 49.0/13.1 |
| Composition 9 | — | SOL5 125.88 35.3 | GTS 57.8/ TEOS 34.6 40.5/24.2 |
| Composition 10 | — | SOL5 115.6 29.9 | GTS 44.8/ TEOS 63.6 29.0/41.1 |

| Coating Composition No. | Solvent (g) | Acid aq. sol. (g) | Water content (ref. mass parts) | Curing catalyst (g) | Surfactant (g) | Transition point (° C.) |
|---|---|---|---|---|---|---|
| Composition 6 | TBA/EGPE/DAA/PGPE = 13.5/7.3/2.5/3.7 | 0.05 N HCl sol. 32.2 | 140 | C1 0.72 | SiL1 0.40 | 172 |
| Composition 7 | TBA/EGPE/water = 14.7/14.7/83.9 | 0.05 N HCl sol. 25.2 | 71 | C1/C2 0.72/0.13 | SiL1 0.40 | 167 |

TABLE 1-continued

| Composition 8 | TBA/EGPE/water = 15.2/15.2/130.7 | 0.05 N HCl sol. 21.6 | 167 | C1 0.84 | SiL1 0.44 | 166 |
| Composition 9 | TBA/IPA/EGPE/water = 9.5/5.2/14.7/125.9 | 0.05 N HCl sol. 25.2 | 159 | C1 0.80 | SiL1 0.40 | 169 |
| Composition 10 | TEA/EGPE/water = 13.5/13.5/115.6 | 0.05 N HCl sol. 32.2 | 140 | C1 0.72 | SiL1 0.40 | 175 |

TABLE 2

| Coating Composition No. | Fine granular silica having grain size of not larger than 7 nm parts Ref. mass | Fine granular silica having grain size of 7 to 30 nm Ref. mass parts | Organosilicon compound (g) Ref. mass parts |
|---|---|---|---|
| Composition 11 | — | SOL5 112.8 28.7 | GTS 29.2/ TEOS 82.7 18.6/52.7 |
| Composition 12 | — | SOL5 162.6 29.9 | GTS 63.0/ TEOS 89.4 29.0/41.1 |
| Composition 13 | — | SOL5 115.6 29.9 | GTS 44.8/ TEOS 63.6 29.0/41.1 |
| Comparative Composition 14 | — | SOL5 47.3 20.1 | GTS 53.4/ TEOS 21.8 56.7/23.2 |
| Composition 15 | SOL1 121 7.8 | SOL5 105.4 27.3 | GTS 78.7/ TEOS 21.5 51.0/13.9 |

| Coating Composition No. | Solvent (g) | Acid aq. sol. (g) | Water content (ref. mass parts) | Curing catalyst (g) | Surfactant (g) | Transition point (° C.) |
|---|---|---|---|---|---|---|
| Composition 11 | TBA/EGPE/water = 13.2/13.2/112.8 | 0.05 N hydrochloric acid sol. 35.3 | 137 | C1 0.72 | SiL1 0.36 | 175 |
| Composition 12 | TBA/MeOH/IPA/EGEE = 9.2/5.5/4.3/19.0 | 0.05 N hydrochloric acid sol. 45.4 | 66 | C1 1.04 | SiL1 0.56 | 173 |
| Composition 13 | TBA/EGPE/MeOH = 13.5/13.5/115.6 | 0.05 N hydrochloric acid sol. 32.2 | 66 | C1 0.72 | SiL1 0.40 | 168 |
| Comparative Composition 14 | MeOH/TBA/AcAc/EGPE = 68.6/27.6/27.6/12.2 | — | 30 | C1 0.63 | SiL1 0.20 | 164 |
| Composition 15 | TBA/IPA/EGPE/water = 39.7/20.5/40.4/45.0 | 0.05 N hydrochloric acid sol. 25.4 | 128 | C1 0.92 | SiL1 0.40 | 169 |

| Coating Composition No. | Fine granular silica having grain size of not larger than 7 nm Ref. mass parts | Fine granular silica having grain size of 7 to 30 nm Ref. mass parts | Organosilicon compound (g) Ref. mass parts |
|---|---|---|---|
| Composition 16 | — | SOL5 72.0 17.5 | GTS 69.2/ TMOS 66.8 42.0/40.5 |
| Composition 17 | — | SOL5 72.0 17.5 | GDS 69.2/ TEOS 66.8 42.0/40.5 |
| Composition 18 | — | SOL5 72.0 17.5 | GTS 69.2/ TEOS 66.8 42.0/40.5 |
| Composition 19 | — | SOL5 115.6 29.9 | GTS 44.8/ TEOS 63.6 29.0/41.1 |

TABLE 2-continued

| Coating Composition No. | Solvent (g) | Acid aq. sol. (g) | Water content (ref. mass parts) | Curing catalyst (g) | Surfactant (g) | Transition point (° C.) |
| --- | --- | --- | --- | --- | --- | --- |
| Composition 16 | TBA/AcAc/MeOH/EGPE/water = 60.0/18.0/60.6/13.6/36.0 | — | 48 | C1 3.36 | SiL1 0.40 | 171 |
| Composition 17 | TBA/AcAc/MeOH/EGPE/water = 60.0/18.0/60.6/13.6/36.0 | — | 48 | C1 3.36 | SiL1 0.40 | 168 |
| Composition 18 | TBA/AcAc/MeOH/EGPE/water = 60.0/18.0/60.6/13.6/36.0 | — | 48 | C1 3.36 | SiL1 0.40 | 170 |
| Composition 19 | TBA/EGPE/MeOH/water = 13.5/13.5/31.6/84.0 | 0.05 N HCl sol. 32.2 | 120 | C1 0.72 | SiL1 0.40 | 173 |

TABLE 3

| Coating Composition No. | Fine granular silica having grain size of not larger than 7 nm Ref. mass parts | Fine granular silica having grain size of 7 to 30 nm Ref. mass parts | Organosilicon compound (g) Ref. mass parts |
| --- | --- | --- | --- |
| Comparative Composition 1 | SOL1 103.3 8.3 | SOL2 137.8 33.2 | GTS 73 58.5 |
| Comparative Composition 2 | SOL1 178.1 18.1 | SOL3 89.0 18.1 | GTS 62.9 63.9 |
| Comparative Composition 3 | SOL1 210.0 41.5 | — — | GTS 29.7 58.5 |
| Comparative Composition 4 | SOL1 189.0 21.2 | — — | GTS 53.4/ MTEOS 16.7 60/18.8 |
| Comparative Composition 5 | — — | SOL2 243.6 51.5 | GTS 68.9 48.5 |

| Coating Composition No. | Solvent (g) | Acid aq. sol. (g) | Water content (ref. mass parts) | Curing catalyst (g) | Surfactant (g) | Transition point (° C.) |
| --- | --- | --- | --- | --- | --- | --- |
| Comparative Composition 1 | MeOH/TBA/AcAc/EGPE = 27.9/25.1/25.1/11.2 | 0.05 N hydrochloric acid sol. 16.7 | 88 | C1 0.52 | SiL1 0.20 | 147 |
| Comparative Composition 2 | MeOH/TBA/AcAc/EGPE = 10.0/26.8/26.8/11.9 | 0.05 N hydrochloric acid sol. 14.4 | 250 | C1 0.45 | SiL1 0.20 | 148 |
| Comparative Composition 3 | MeOH/TBA/AcAc/EGPE = 93.8/32.6/32.6/14.5 | 0.05 N hydrochloric acid sol. 6.8 | 386 | C1 0.21 | SiL1 0.20 | 146 |
| Comparative Composition 4 | MeOH/TBA/AcAc/EGPE = 74.5/28.2/28.2/12.6 | 0.05 N hydrochloric acid sol. 17.3 | 211 | C1 0.32 | SiL1 0.20 | 145 |
| Comparative Composition 5 | MeOH/TBA/AcAc/EGPE = 34.1/23.6/23.6/10.5 | — | 0 | C1 0.61 | SiL1 0.20 | 142 |

| Coating Composition No. | Fine granular silica having grain size of not larger than 7 nm Ref. mass parts | Fine granular silica having grain size of 7 to 30 nm Ref. mass parts | Organosilicon compound (g) Ref. mass parts |
| --- | --- | --- | --- |
| Comparative Composition 6 | — — | SOL2 154.2 29.9 | GTS 44.8/ TEOS 63.6 29.0/41.1 |

TABLE 3-continued

| | | | | |
|---|---|---|---|---|
| Comparative Composition 7 | — | SOL4 198.0 36.2 | GTS 54.4/ TEOS 15.3 49.8/14.0 | |
| Comparative Composition 8 | — | SOL4 198.0 32.8 | GTS 70.0/ TEOS 11.0 58.0/9.1 | |
| Comparative Composition 9 | — | SOL4 198.0 30.6 | GTS 10.0/ TEOS 80.0 7.7/61.7 | |
| Comparative Composition 10 | — | SOL6 154.2 29.9 | GTS 44.8/ TEOS 63.6 29.0/41.1 | |

| Coating Composition No. | Solvent (g) | Acid aq. sol. (g) | Water content (ref. mass parts) | Curing catalyst (g) | Surfactant (g) | Transition point (°C.) |
|---|---|---|---|---|---|---|
| Comparative Composition 6 | TBA/EGPE/MeOH = 14.7/14.7/83.9 | 0.05 N HCl sol. 25.2 | 16 | C1 0.72 | SiL1 0.40 | 148 |
| Comparative Composition 7 | TBA/EGPE/DAA = 79.4/13.2/20.9 | 0.05 N HCl sol. 17.8 | 161 | C3 0.55 | SiL1 0.44 | 145 |
| Comparative Composition 8 | TBA/EGBE/DAA = 79.4/13.2/20.9 | 0.05 N HCl sol. 17.8 | 154 | C1/C2 0.64/0.15 | SiL1 0.44 | 147 |
| Comparative Composition 9 | TBA/EGBE/DAA = 79.4/13.2/20.9 | 0.05 N HCl sol. 17.8 | 136 | C1/C2 0.64/0.15 | SiL1 0.44 | 144 |
| Comparative Composition 10 | TBA/EGPE/water = 14.7/14.7/83.9 | 0.05 N HCl sol. 25.2 | 71 | C1/C2 0.72/0.13 | SiL1 0.40 | 149 |

In the following Examples and Comparative Examples, hard coatings were formed on the surfaces of the ordinary plastic lenses by using the coating compositions prepared as described above, and were evaluated for their appearance, steel wool scratch resistance, Bayer scratch resistance and close adhesion in compliance with the methods described below. Ten pieces of lenses having the hard coating were prepared in each of the following Examples and Comparative Examples for evaluation. Table 4 shows the most poorly evaluated results of appearance and steel wool scratch resistance of the lenses among ten pieces of lenses. Table 4 further shows average values of Bayer scratch resistance and close adhesion of ten pieces of lenses.

Appearance

Presence of cracks in the hard coating was observed by eyes to evaluate the appearance on the following basis.

○: Transparent and no crack was recognized.

X: Cracks developed and the appearance was obviously poor.

Steel Wool Scratch Resistance

The surfaces of the lenses (surfaces of the hard coatings) were rubbed with a steel wool (BONSTAR #0000 produced by Nihon Steel Wool Co.) ten round trips while applying a load of 1 kg thereto, and the scratched degree was evaluated by eyes on the following basis.

A: Were not almost scratched.

B: Scratched to only a slight degree.

C: Scratched a little.

D: Scratched.

E: Hard coating was peeled.

Bayer Scratch Resistance (Measuring the Bayer Values)

The surface of the lens base member without hard coating (uncoated lens) and the surface of the hard coating formed on the lens base member (surface of the hard-coated lens) were scratched as described below in compliance with the Bayer testing method (ASTM D-4060 or ASTM F735-81).

That is, the uncoated lens and the hard-coated lens were inserted with their convex surfaces facing upward in a polishing agent holder having two holes of a diameter of 50 mm from the lower side of the hole. Next, 500 g of a commercially available polishing agent (alumina/zirconia polishing agent produced by SAINT-GOBAIN CERAMIC MATERIALS CANADA, INC.) was introduced into the polishing agent holder. The two lenses thus inserted were oscillated at an oscillation of 150 strokes a minute with a stroke of 4 inches for a total of 2 minutes to polish and scratch the surfaces of the two lenses.

Next, the lenses were measured for their haze by using a spectrometer (Haze meter manufactured by Suga Shinki Co.) to find a difference in the haze values before and after scratched to thereby calculate the Bayer value according to the following formula.

Bayer value=ΔHaze (uncoated)/ΔHaze (hard coating)
wherein ΔHaze (uncoated) is a value obtained by subtracting the haze value of before the testing from the haze value of after the testing of the uncoated lens, and ΔHaze (hard coating) is a value obtained by subtracting the haze value of before the testing from the haze value of after the testing of the hard-coated lens.

The larger the value, the higher the surface hardness and more excellent the scratch resistance. Usually, the surface is hard if the value is 4 or larger, and a hardness comparable to that of a glass is obtained if the value is 6 or larger exhibiting very excellent scratch resistance.

Adhesion

Adhesion of the coating to the lens was evaluated by a cross-cut tape testing in compliance with the JIS D-0202.

That is, by using a cutter knife, grooves were formed in the surface of the hard coating maintaining a gap of about 1 mm to form 100 frames. An adhesive cellophane tape (Cellotape manufactured by Nichiban Co.) was strongly stuck thereon, and was pulled and peeled off at one time in a direction of 90° from the surface thereof to count the number of the frames having the hard coating remaining thereon.

The evaluated result was expressed as (number of the frames having the hard coating)/100.

Example 1

A lens base member CR having a thickness of about 2 mm and two convex surfaces on both sides thereof was dipped in an aqueous solution maintained at 60° C. and containing 10% by weight of sodium hydroxide, and was etched with an alkali by using an ultrasonic washing device for 10 minutes. After etched with the alkali, the lens base member was washed with distilled water and with hot water of 50° C. to remove the remaining alkali, followed by drying at room temperature for 2 hours. The lens base member was dip-coated with the coating composition 1 at 20° C. and at a pull-up speed of 30 cm/min. Thereafter, the coating composition was pre-cured in an oven maintained at 70° C. and was cured at 120° C. for one hour to thereby obtain a hard-coated lens forming a hard coating of a thickness of 2.6 μm on both surfaces of the lens base member CR.

The hard-coated lens was evaluated for its appearance, steel wool scratch resistance, Bayer scratch resistance and close adhesion to obtain the results of appearance: 0, steel wool scratch resistance: A, Bayer scratch resistance (Bayer value): 7.4, and adhesion: 100/100 as shown in Table 4.

Examples 2 to 5

Hard coatings were formed on the surfaces of the lens base members CR by being coated in the same manner as in Example 1 but using the coating compositions 3, 9, 10 and 18 prepared above, and were evaluated for their properties. The results were as shown in Table 4 which also shows the thicknesses of the hard coatings.

Comparative Examples 1 to 9

Hard coatings were formed on the surfaces of the lens base members CR by being coated in the same manner as in Example 1 but using the comparative coating compositions 1 to 9 prepared above, and were evaluated for their properties. The results were as shown in Table 4 which also shows the thicknesses of the hard coatings. The comparative coating composition 9 (Comparative Example 9) developed much cracks after the curing and, therefore, its appearance was not evaluated.

TABLE 4

| No. | Lens base member | Coating composition | Properties of hard coating | | | | |
|---|---|---|---|---|---|---|---|
| | | | Thickness (μm) | Appearance | Steel wool scratch resistance | Bayer scratch resistance | Close adhesion |
| Example 1 | CR | composition 1 | 2.6 | ○ | A | 7.4 | 100/100 |
| Example 2 | CR | composition 3 | 2.7 | ○ | A | 8.9 | 100/100 |
| Example 3 | CR | composition 9 | 2.7 | ○ | A | 8.6 | 100/100 |
| Example 4 | CR | composition 10 | 2.5 | ○ | A | 9.4 | 100/100 |
| Example 5 | CR | composition 18 | 3.0 | ○ | A | 8.8 | 100/100 |
| Comp. Ex. 1 | CR | comp. composition 1 | 3.0 | ○ | A | 6.8 | 100/100 |
| Comp. Ex. 2 | CR | comp. composition 2 | 3.0 | ○ | A | 6.9 | 100/100 |
| Comp. Ex. 3 | CR | comp. composition 3 | 2.7 | ○ | A | 6.2 | 100/100 |
| Comp. Ex. 4 | CR | comp. composition 4 | 2.7 | ○ | A | 6.5 | 100/100 |
| Comp. Ex. 5 | CR | comp. composition 5 | 2.9 | ○ | A | 3.2 | 100/100 |
| Comp. Ex. 6 | CR | comp. composition 6 | 3.1 | ○ | A | 4.3 | 100/100 |
| Comp. Ex. 7 | CR | comp. composition 7 | 2.6 | ○ | A | 3.8 | 100/100 |
| Comp. Ex. 8 | CR | comp. composition 8 | 2.8 | ○ | A | 4.0 | 100/100 |
| Comp. Ex. 9 | CR | comp. composition 9 | 2.5 | X (cracks) | — | — | — |

Preparation of a Photochromic Curable Composition (A)

A mixture of the radically polymerizable monomers of the following recipe was prepared.

Mixture of the Radically Polymerizable Monomers:

| | |
|---|---|
| BPEO | 40 parts by mass |
| 9GDA | 15 parts by mass |
| TMPT | 25 parts by mass |
| EB6A | 10 parts by mass |
| GMA | 10 parts by mass |

To 100 parts by mass of the mixture of the radically polymerizable monomers, the following photochromic compounds were added:

| | |
|---|---|
| amino group-containing chromene compound PC1 | 2.0 parts by mass |
| amino group-containing chromene compound PC2 | 0.6 parts by mass |
| amino group-containing chromene compound PC3 | 0.4 parts by mass | and the mixture was dissolved with ultrasonic waves at 70° C. for 30 minutes.

To the thus obtained composition were added the following components:

| | |
|---|---|
| photo polymerization initiator CGI1870 | 0.35 parts by mass |
| stabilizer LS765 | 5 parts by mass |
| silane coupling agent TSL | 7 parts by mass |
| leveling agent SiL1 | 0.1 part by mass | and the mixture was stirred to a sufficient degree to prepare a photochromic curable composition (A). The thus obtained photochromic curable composition (A) exhibited a viscosity at 25° C. of 130 cP.

The components blended in the photochromic curable composition (A) and the viscosity thereof were as shown in Table 5.

Preparation of the Photochromic Curable Compositions (B) to (P)

By using the radically polymerizable monomers, photochromic compounds, polymerization initiators, stabilizers, silane coupling agents and leveling agents shown in Table 5 in amounts shown in Table 5, the photochromic compositions (B) to (P) were prepared by the same method as that of preparing the photochromic composition (A).

The components blended in the photochromic curable compositions (B) to (P) and their viscosities were as shown in Table 5.

TABLE 5

| Photochromic composition | Radically polymerizable monomer (pts by wt) | Photochromic compound (pts by wt) | Polymerization initiator (pts by wt) |
|---|---|---|---|
| A | BPEO/9GDA/TMPT/EB6A/GMA 40/15/25/10/10 | PC1/PC2/PC3 2.0/0.6/0.4 | CGI1870 0.35 |
| B | BPEO/9GDA/TMPT/EB6A/GMA 40/15/25/10/1 | PC1/PC2/PC3/PC4 1.69/0.215/0.143/1.08 | CGI1870 0.35 |
| C | BPEO/9GDA/TMPT/EB6A/GMA 50/15/10/15/1 | PC1/PC2/PC3/PC4 1.69/0.215/0.143/1.08 | CGI1870 0.35 |
| D | BPEO/9GDA/TMPT/GMA 40/20/30/3 | PC1/PC2/PC3/PC4 1.69/0.215/0.143/1.08 | CGI1870 0.35 |
| E | BPEO/9GDA/TMPT/EB6A/GMA 40/15/20/15/3 | PC1/PC2/PC3/PC4 1.69/0.215/0.143/1.08 | CGI1870 0.35 |
| F | BPEO/9GDA/TMPT/EB6A/GMA 50/20/5/15/3 | PC1/PC2/PC3/PC4/PC7 1.3/0.215/0.143/1.08/0.2 | CGI1870 0.35 |
| G | BPE/BPEO/9GDA/TMPT/EB6A/GMA 10/30/5/35/10/5 | PC1/PC4/PC6 0.5/1.05/1.2 | CGI1870 0.35 |
| H | BPEO/9GDA/TMPT/U6A/GMA 40/15/25/10/1 | PC4/PC2/PC8/PC11 0.56/0.25/2.0/0.30 | CGI1870 0.35 |

| Photochromic composition | Stabilizer (pts by wt) | Silane coupling agent (pts by wt) | Leveling agent (pts by wt) | Others (pts by wt) | Viscosity (cP) |
|---|---|---|---|---|---|
| A | LS765 5.0 | TSL 7.0 | SiL1 0.1 | — | 130 |
| B | LS765 5.0 | TSL 7.0 | SiL1 0.1 | — | 137 |
| C | LS765 5.0 | TSL 7.0 | SiL1 0.1 | — | 142 |
| D | LS765 5.0 | TSL 7.0 | SiL1 0.1 | — | 108 |
| E | LS765 5.0 | TSL 7.0 | SiL1 0.1 | — | 139 |
| F | LS765 5.0 | TSL 7.0 | SiL1 0.1 | — | 145 |
| G | LS765 5.0 | TSL 7.0 | SiL1 0.1 | — | 125 |
| H | LS765 5.0 | TSL 7.0 | SiL1 0.1 | — | 135 |

| Photochromic composition | Radically polymerizable monomer (pts by wt) | Photochromic compound (pts by wt) | Polymerization initiator (pts by wt) |
|---|---|---|---|
| I | BPEO/9GDA/TMPT/EB6A/GMA 40/15/25/10/1 | PC5/PC4/PC2/PC1 0.10/0.90/0.74/0.5 | CGI1870 0.80 |
| J | BPEO/9GDA/TMPT/EB6A/GMA 50/15/15/10/10 | PC1/PC2/PC3/PC4 2.35/0.30/0.20/1.50 | CGI1800 0.50 |
| K | BPEO/9GDA/TMPT/EB6A/GMA 40/15/25/10/1 | PC4/PC2/PC12/PC1/PC10/PC9 0.55/0.20/2.0/0.50/0.35/0.30 | CGI1870 0.35 |
| L | BPEO/9GDA/TMPT/EB6A/GMA 40/15/25/10/1 | PC4/PC2/PC12/PC1/PC8/PC9 0.55/0.20/2.0/0.50/0.55/0.30 | CGI1870 0.35 |
| M | BPEO/9GDA/TMPT/EB6A/GMA 40/15/25/10/10 | PC1 1.5 | CGI1870 0.35 |
| N | BPEO/9GDA/TMPT/EB6A/GMA 40/15/25/10/10 | PC13 1.5 | CGI1870 0.35 |

TABLE 5-continued

| | | | | | |
|---|---|---|---|---|---|
| O | BPEO/9GDA/TMPT/EB6A/GMA 40/15/25/10/10 | PC14 1.5 | | | CGI1870 0.35 |
| P | BPEO/9GDA/TMPT/EB6A/GMA 40/15/25/10/1 | PC12 1.5 | | | CGI1870 0.35 |

| Photochromic composition | Stabilizer (pts by wt) | Silane coupling agent (pts by wt) | Leveling agent (pts by wt) | Others (pts by wt) | Viscosity (cP) |
|---|---|---|---|---|---|
| I | LS765/IRG245 5.0/3.0 | TSL 6.5 | SiL1 0.1 | — | 135 |
| J | LS765 5.0 | TSL 7.0 | — | NMDEA 3.0 | 120 |
| K | LS765 5.0 | TSL 7.0 | SiL1 0.1 | — | 140 |
| L | LS765 5.0 | TSL 7.0 | SiL1 0.1 | — | 138 |
| M | LS765 5.0 | TSL 7.0 | SiL1 0.1 | — | 125 |
| N | LS765 5.0 | TSL 7.0 | SiL1 0.1 | — | 127 |
| O | LS765 5.0 | TSL 7.0 | SiL1 0.1 | — | 126 |
| P | LS765 5.0 | TSL 7.0 | SiL1 0.1 | — | 132 |

In the following Examples and Comparative Examples, photochromic lenses were prepared by the coating method by using the above photochromic curable compositions (A) to (P) and, thereafter, hard coatings were formed on the surfaces of the photochromic lenses by using the coating compositions prepared above to thereby prepare photochromic hard-coated lenses and to evaluate the photochromic properties, red deterioration, yellow deterioration and Vickers' hardness in addition to the above-mentioned properties in compliance with the methods described below. Here, ten pieces of each of the photochromic lenses and the photochromic hard-coated lenses were prepared in each of the following Examples and Comparative Examples for evaluation. Tables 6 to 8 show average values of photochromic properties, red deterioration, yellow deterioration and Vickers' hardness.

Evaluation of the Phorochromic Properties and Red Deterioration

To evaluate the photochromic properties, the color density was measured according to the following method.

The sample lens was irradiated with light emitted from a xenon lamp L-2480 (300 W) SHL-100 manufactured by Hamamatsu Photonics Co. through an ultraviolet ray transmission filter UV22 and a heat ray absorption filter HA50 (both of which manufactured by Hoya Co.) to develop a color. The conditions of irradiating light were as described below.

Conditions of Irradiating Light:
Ambient temperature: 20° C.±1° C.
Beam intensity on the sample lens surface:
365 nm=2.4 mW/cm²
245 nm=24 μW/cm²
Irradiation time: 120 seconds A maximum absorption wavelength of when developing a color was found by using a spectrophotometer (instantaneous multi-channel photo detector MCPD3000) manufactured by Otsuka Denshi Kogyo Co. Further, an absorbancy [ε (120)] at the maximum absorption wavelength of when developing a color and an absorbancy [ε (0)] at the above wavelength of when the lens is not being irradiated with light were found, and a difference between the two was evaluated as a color density.

Color density=ε(120)−ε(0).

Further, a*-values were measured when developing a color and when fading. Here, the a*-value stands for a reddish color and is a* in a CIE1976 (L*a*b*) color space (CIELAB). Further, "when developing a color" referred to here is after the sample lens surface was irradiated with the light of the xenon lamp having the above intensity for 2 minutes and "when fading" (corresponds to when developing no color) is after the sample lens irradiated with the xenon lamp for 2 minutes was left to stand in a dark place for 5 minutes.

The red deterioration can be evaluated relying upon the thus found a*-values.

That is, the red deterioration can be evaluated based on a difference in the a*-value of when the photochromic lens having the hard coating (photochromic hard-coated lens) is developing a color and is fading and on a difference in the a*-values of when the photochromic lens without the hard coating (photochromic uncoated lens) is developing a color and is fading. The larger the difference, the larger the degree of red deterioration (changing into red color). The smaller the difference, on the other hand, the higher the effect for preventing the red deterioration.

Evaluation of the Yellow Deterioration

The deterioration acceleration testing was conducted to evaluate the yellow deterioration by the irradiation with light.

That is, the sample photochromic lens was deteriorated in an accelerated manner by the irradiation with light by using the Xenon Weather-Ometer X25 (xenon arc lamp of 2.5 kW) manufactured by Suga Shikenki Co. under the conditions of an irradiation intensity of 40 W/m² and a lens surface temperature of 50° C. for 100 hours.

Next, by using an SM color computer (SM-T) manufactured by Suga Shikenki Co., YI ($YI_0$) of before the accelerated deterioration and YI ($YI_{100}$) of after the accelerated deterioration were measured to find a degree of yellow deterioration according to the following formula and to evaluate the yellow deterioration.

Degree of yellow deterioration ($\Delta YI$)=$YI_{100}$−$YI_0$

The smaller the degree of yellow deterioration ($\Delta YI$), the smaller the degree of yellow deterioration of the lens after deteriorated and the more excellent the resistance against the yellow deterioration.

Vickers' Hardness (Hv)

By using the Micro-Vickers' hardness meter (MHT-1) manufactured by Matsuzawa Seiki Co., the photochromic lens (photochromic uncoated lens) without the hard coating was measured for its Vickers' hardness Hv.

That is, a square sample of about 5 mm was cut out from the photochromic uncoated lens base member, set onto a sampling plate, a diamond indenter was pushed onto it with a load of 10 g, the length (d) of the indented diagonal line was measured, and the Vickers' hardness Hv was calculated according to the following formula, $$Hv(kg/mm^2)=1.8543\, p/d^2$$

p: testing load (0.01 kg)

d: length of indented diagonal line (mm)

Example 6

Preparation of a Photochromic Lens

A lens base member MRB of a thickness of 2 mm was prepared, dewaxed with acetone to a sufficient degree, treated in a 5% sodium hydroxide aqueous solution maintained at 50° C. for 4 minutes, washed with flowing water for 4 minutes, washed with distilled water maintained at 40° C. for 4 minutes, and was dried at 70° C.

Next, a moisture-curing primer (TAKESEAL PFR402TP-4 manufactured by Takebayashi Kagaku Kogyo Co.) and an ethyl acetate were mixed together each in an amount of 50 parts by mass, and to the mixed solution was added 0.03 parts by mass of the leveling agent SiL2 (silicone surfactant). The mixture was sufficiently stirred until it became homogeneous in a nitrogen atmosphere to thereby obtain a primer composition.

By using a spin coater, 1H-DX2, manufactured by Mikasa Co., the surfaces of the MRB lens base member were spin-coated with the primer composition. The MRB lens base member was left to stand at room temperature for 15 minutes to prepare a lens base member (primer-treated lens) having a primer layer of a thickness of 7 μm.

Next, the surfaces of the above primer-treated lens was spin-coated with about 1 g of the photochromic curable composition (A), irradiated with ultraviolet rays under the conditions described below in a nitrogen gas atmosphere, and were heat-treated in a constant temperature oven maintained at 110° C. to obtain a photochromic lens having a photochromic coating of a thickness of 40±1 μm.

Ultraviolet Ray Irradiation Conditions:

Source of light; D Bulb-mounting F3000SQ manufactured by Fusion UV Systems Co.

Output; 150 mW/cm$^2$ (405 nm)

Irradiation time; 3 min.

The thus prepared photochromic lens (uncoated) was evaluated for its photochromic properties (color density), red deterioration (a*-value), yellow deterioration ΔYI and Vickers' hardness. The color density at a maximum absorption wavelength of 588 nm was 1.05, a*-value when developing color was 1.3, a*-value when fading was −1.1, yellow deterioration ΔYI was 11.1, and Vickers' hardness was 5.1 kg/mm$^2$. These results are shown in Table 6.

Preparation of a Photochromic Hard-Coated Lens

By using a corona discharge device, MultiDynel, manufactured by Navitus Co., the above photochromic lens was treated with corona discharge for 30 seconds and was, further, dipped in a 20% NaOH aqueous solution maintained at 60° C. for 10 minutes. The thus treated photochromic lens was dipped in the coating composition 1 prepared above, and was pulled up at a rate of 30 cm/min. to apply the hard coating composition 1 onto the surfaces thereof. Next, the hard coating composition 1 was dried at 70° C. for 10 minutes, cured at a temperature of 110° C. for 2 hours to form a hard coating of a thickness of about 3 μm to thereby obtain a photochromic hard-coated lens.

The photochromic hard-coated lens was evaluated for a variety of properties to obtain the following results which are also shown in Table 6.

Appearance: ○

Steel wool scratch resistance: A

Bayer scratch resistance: 7.3

Adhesiveness: 100/100

Color density at a maximum absorption wavelength of 588 nm: 1.01 a*-Value when developing color: 1.4 a*-Value when fading: −1.1

Degree of yellow deterioration ΔYI: 3.5

Examples 7 to 36 and 38 to 44 and Comparative Examples 10 to 20 and 37

Photochromic lenses (uncoated) were prepared by the same method as that of Example 6 but using the lens base members and photochromic curable compositions shown in Tables 6 to 8, and were evaluated in the same manner as in Example 6 to obtain the results as shown in Tables 6 to 8.

By using the compositions shown in Tables 6 to 8, further, hard coatings were formed on the above photochromic lenses by the same method as that of Example 6 to obtain photochromic hard-coated lenses. The photochromic hard-coated lenses were evaluated in the same manner as in Example 6 to obtain the results as shown in Table 6.

Example 8, however, has used the coating composition 2 after preserved at 20° C. for one month.

In Comparative Example 18 that has used the comparative coating position 9, cracks have occurred much in the hard coating, and the photochromic lens was not evaluated except the appearance.

Comparative Example 21

A photochromic lens was prepared by the same method as that of Example 6 but using the lens base member shown in Table 8, and was evaluated in the same manner as in Example 6.

Further, a hard coating was formed on the above photochromic lens by using a commercially available coating composition, i.e., a hard-coating agent (TS56H, trade name, manufactured by Tokuyama Co.) to thereby obtain a photochromic hard-coated lens which was evaluated in the same manner as in Example 6 to obtain the results as shown in Table 8.

TABLE 6

| No. | Lens base member | Photochromic composition | Coating composition | Photochromic lens (uncoated) | | | | | |
|---|---|---|---|---|---|---|---|---|---|
| | | | | properties | | a* | | | |
| | | | | λmax (nm) | Color density | When developing color | When fading | ΔYI | Hv (kg/mm$^2$) |
| Ex. 6 | CR | A | composition 1 | 588 | 1.04 | 1.2 | −1.2 | 11.1 | 5.1 |
| Ex. 7 | MRA | A | composition 2 | 588 | 1.04 | 1.3 | −1.0 | 11.0 | 5.2 |
| Ex. 8 | MRA | A | composition 2* | 588 | 1.04 | 1.3 | −1.0 | 11.0 | 5.2 |
| Ex. 9 | MRA | A | composition 3 | 588 | 1.04 | 1.3 | −1.0 | 11.0 | 5.2 |
| Ex. 10 | MRA | A | composition 4 | 588 | 1.04 | 1.3 | −1.0 | 11.0 | 5.2 |
| Ex. 11 | MRA | A | composition 5 | 588 | 1.04 | 1.3 | −1.0 | 11.0 | 5.2 |
| Ex. 12 | CR | A | composition 6 | 588 | 1.04 | 1.2 | −1.2 | 11.1 | 5.1 |
| Ex. 13 | CR | A | composition 7 | 588 | 1.04 | 1.2 | −1.2 | 11.1 | 5.1 |
| Ex. 14 | MRB | A | composition 8 | 588 | 1.04 | 1.2 | −1.1 | 10.7 | 5.2 |

| No. | Photochromic hard-coated lens | | | | | | | | |
|---|---|---|---|---|---|---|---|---|---|
| | Thickness of hard coating (μm) | Appearance | Steel wool scratch resistance | Bayer scratch resistance | Adhesion to convex surface | properties | | a* | |
| | | | | | | λmax (nm) | Color density | When developing color | When fading | ΔYI |
| Ex. 6 | 2.6 | ○ | A | 7.3 | 100/100 | 588 | 1.01 | 1.4 | −1.1 | 3.5 |
| Ex. 7 | 2.6 | ○ | A | 8.0 | 100/100 | 588 | 1.00 | 1.3 | −1.0 | 2.3 |
| Ex. 8 | 2.6 | ○ | A | 7.8 | 100/100 | 588 | 1.00 | 1.4 | −1.0 | 2.5 |
| Ex. 9 | 2.6 | ○ | A | 8.2 | 100/100 | 588 | 1.03 | 1.3 | −1.0 | 2.3 |
| Ex. 10 | 3.3 | ○ | A | 8.0 | 100/100 | 586 | 1.03 | 1.3 | −1.2 | 2.4 |
| Ex. 11 | 3.2 | ○ | A | 8.4 | 100/100 | 586 | 1.03 | 1.3 | −1.1 | 2.1 |
| Ex. 12 | 3.5 | ○ | A | 8.4 | 100/100 | 588 | 1.01 | 1.2 | −1.0 | 1.9 |
| Ex. 13 | 2.4 | ○ | A | 7.9 | 100/100 | 588 | 1.01 | 1.3 | −1.1 | 2.3 |
| Ex. 14 | 2.6 | ○ | A | 7.8 | 100/100 | 588 | 1.04 | 1.2 | −0.8 | 2.6 |

| No. | Lens base member | Photochromic composition | Coating composition | Photochromic lens (uncoated) | | | | | |
|---|---|---|---|---|---|---|---|---|---|
| | | | | properties | | a* | | | |
| | | | | λmax (nm) | Color density | When developing color | When fading | ΔYI | Hv (kg/mm$^2$) |
| Ex. 15 | MRB | A | composition 9 | 588 | 1.04 | 1.2 | −1.1 | 10.7 | 5.2 |
| Ex. 16 | MRA | A | composition 10 | 588 | 1.04 | 1.3 | −1.0 | 11.0 | 5.2 |
| Ex. 17 | POL | A | composition 11 | 588 | 1.03 | 1.3 | −1.2 | 10.8 | 5.2 |
| Ex. 18 | CR | A | composition 12 | 588 | 1.04 | 1.2 | −1.2 | 11.1 | 5.1 |
| Ex. 19 | POL | A | composition 13 | 588 | 1.03 | 1.3 | −1.2 | 10.8 | 5.2 |
| Ex. 20 | MRA | A | composition 4' | 588 | 1.04 | 1.3 | −1.0 | 11.0 | 5.2 |
| Ex. 21 | POL | A | composition 4" | 588 | 1.03 | 1.3 | −1.2 | 10.8 | 5.2 |
| Ex. 22 | POL | B | composition 3 | 584 | 0.95 | 1.5 | −0.5 | 10.7 | 5.5 |
| Ex. 23 | MRB | B | composition 10 | 584 | 0.98 | 1.4 | −0.4 | 10.8 | 5.2 |
| Ex. 24 | POL | C | composition 3 | 582 | 1.00 | 1.4 | −0.5 | 11.3 | 1.7 |

TABLE 6-continued

| | | | | | | | a* | | |
|---|---|---|---|---|---|---|---|---|---|
| | Thickness of hard coating (μm) | Appearance | Steel wool scratch resistance | Bayer scratch resistance | Adhesion to convex surface | properties | | When | |
| No. | | | | | | λmax (nm) | Color density | When developing color | When fading | ΔYI |
| Ex. 15 | 2.7 | ○ | A | 8.2 | 100/100 | 586 | 1.03 | 1.2 | −1.2 | 2.2 |
| Ex. 16 | 2.4 | ○ | A | 8.5 | 100/100 | 586 | 1.00 | 1.3 | −0.8 | 1.7 |
| Ex. 17 | 2.5 | ○ | A | 8.8 | 100/100 | 586 | 0.99 | 1.3 | −0.8 | 1.6 |
| Ex. 18 | 2.8 | ○ | A | 8.4 | 100/100 | 588 | 0.97 | 1.4 | −1.0 | 1.8 |
| Ex. 19 | 2.7 | ○ | A | 8.0 | 100/100 | 586 | 1.04 | 1.3 | −0.9 | 2.2 |
| Ex. 20 | 3.6 | ○ | A | 7.8 | 100/100 | 586 | 1.00 | 1.3 | −0.8 | 2.4 |
| Ex. 21 | 3.2 | ○ | A | 8.1 | 100/100 | 588 | 0.98 | 1.4 | −1.2 | 2.3 |
| Ex. 22 | 2.5 | ○ | A | 8.0 | 100/100 | 584 | 0.94 | 1.5 | −0.4 | 2.3 |
| Ex. 23 | 2.6 | ○ | A | 8.6 | 100/100 | 586 | 0.96 | 1.4 | −0.4 | 1.8 |
| Ex. 24 | 2.5 | ○ | A | 7.8 | 100/100 | 584 | 0.95 | 1.5 | −0.6 | 2.4 |

*The composition 2 preserved at 20° C. for one month was used.

TABLE 7

| | | | | Photochromic lens (uncoated) | | | | | |
|---|---|---|---|---|---|---|---|---|---|
| | Lens base member | Photochromic composition | Coating composition | properties | | a* When developing color | When fading | ΔYI | Hv (kg/mm$^2$) |
| No. | | | | λmax (nm) | Color density | | | | |
| Ex. 25 | MRB | D | composition 7 | 582 | 0.95 | 1.5 | −0.6 | 10.3 | 6.7 |
| Ex. 26 | CR | E | composition 11 | 582 | 0.97 | 1.4 | −0.6 | 10.5 | 2.5 |
| Ex. 27 | MRA | F | composition 16 | 584 | 0.93 | 1.6 | −0.3 | 10.6 | 0.7 |
| Ex. 28 | MRB | G | composition 13 | 602 | 0.73 | −2.3 | −3.7 | 11.5 | 7.3 |
| Ex. 29 | MRB | H | composition 11 | 584 | 0.93 | 2.2 | −0.1 | 11.2 | 4.8 |
| Ex. 30 | CR | I | composition 3 | 574 | 0.60 | 8.2 | 2.3 | 11.6 | 5.6 |
| Ex. 31 | MRA | J | composition 4 | 586 | 0.97 | 1.8 | −1.3 | 10.3 | 3.2 |
| Ex. 32 | POL | K | composition 5 | 588 | 1.05 | 1.7 | −1.0 | 7.3 | 5.5 |
| Ex. 33 | POL | L | composition 6 | 586 | 1.03 | 1.8 | −0.8 | 6.8 | 5.1 |
| Ex. 34 | POL | M | composition 9 | 592 | 0.92 | 0.2 | −0.3 | 7.8 | 5.3 |

| | | | | | | Photochromic hard-coated lens | | a* | | |
|---|---|---|---|---|---|---|---|---|---|---|
| | Thickness of hard coating (μm) | Appearance | Steel wool scratch resistance | Bayer scratch resistance | Adhesion to convex surface | properties | | When developing color | When fading | ΔYI |
| No. | | | | | | λmax (nm) | Color density | | | |
| Ex. 25 | 2.7 | ○ | A | 7.9 | 100/100 | 582 | 0.92 | 1.7 | −0.5 | 2.2 |
| Ex. 26 | 2.5 | ○ | A | 8.7 | 100/100 | 580 | 0.95 | 1.5 | −0.7 | 1.6 |
| Ex. 27 | 2.7 | ○ | A | 8.4 | 100/100 | 582 | 0.91 | 1.6 | −0.4 | 1.7 |
| Ex. 28 | 2.5 | ○ | A | 7.8 | 100/100 | 600 | 0.70 | −2.3 | −3.9 | 2.1 |
| Ex. 29 | 2.8 | ○ | A | 8.7 | 100/100 | 584 | 0.92 | 2.4 | −0.1 | 1.8 |
| Ex. 30 | 2.5 | ○ | A | 8.1 | 100/100 | 572 | 0.58 | 8.3 | 2.5 | 2.5 |
| Ex. 31 | 3.4 | ○ | A | 8.2 | 100/100 | 588 | 0.93 | 1.8 | −1.4 | 2.5 |
| Ex. 32 | 3.1 | ○ | A | 8.4 | 100/100 | 588 | 1.01 | 1.7 | −1.1 | 1.3 |
| Ex. 33 | 3.4 | ○ | A | 8.3 | 100/100 | 586 | 1.02 | 2.0 | −0.5 | 1.2 |
| Ex. 34 | 2.6 | ○ | A | 8.1 | 100/100 | 590 | 0.89 | 0.3 | −0.3 | 1.3 |

TABLE 7-continued

Photochromic lens (uncoated)

| No. | Lens base member | Photochromic composition | Coating composition | λmax (nm) | Color density | a* When developing color | a* When fading | ΔYI | Hv (kg/mm²) |
|---|---|---|---|---|---|---|---|---|---|
| Ex. 35 | POL | N | composition 10 | 474 | 0.61 | 4.0 | 1.4 | 6.7 | 5.1 |
| Ex. 36 | POL | O | composition 11 | 578 | 0.82 | 3.9 | −0.2 | 6.1 | 5.3 |
| Comp. Ex. 37 | MRA | A | Comparative composition 14 | 588 | 1.04 | 1.3 | −1.0 | 11.0 | 5.2 |
| Ex. 38 | MRA | A | composition 15 | 588 | 1.04 | 1.3 | −1.0 | 11.0 | 5.2 |
| Ex. 39 | MRA | A | composition 16 | 588 | 1.04 | 1.3 | −1.0 | 11.0 | 5.2 |
| Ex. 40 | MRA | A | composition 17 | 588 | 1.04 | 1.3 | −1.0 | 11.0 | 5.2 |
| Ex. 41 | MRA | A | composition 18 | 588 | 1.04 | 1.3 | −1.0 | 11.0 | 5.2 |
| Ex. 42 | MRA | P | composition 18 | 590 | 0.87 | −4.4 | −3.1 | 4.5 | 5.1 |
| Ex. 43 | MRA | A | composition 13 | 588 | 1.04 | 1.3 | −1.0 | 11.0 | 5.2 |
| Ex. 44 | MRA | A | composition 19 | 588 | 1.04 | 1.3 | −1.0 | 11.0 | 5.2 |

Photochromic hard-coated lens

| No. | Thickness of hard coating (μm) | Appearance | Steel wool scratch resistance | Bayer scratch resistance | Adhesion to convex surface | λmax (nm) | Color density | a* When developing color | a* When fading | ΔYI |
|---|---|---|---|---|---|---|---|---|---|---|
| Ex. 35 | 2.6 | ○ | A | 8.2 | 100/100 | 474 | 0.60 | 4.2 | 1.5 | 1.2 |
| Ex. 36 | 2.7 | ○ | A | 8.1 | 100/100 | 578 | 0.81 | 4.0 | −0.2 | 1.1 |
| Comp. Ex. 37 | 2.6 | ○ | A | 7.5 | 100/100 | 588 | 1.03 | 1.3 | −1.0 | 2.8 |
| Ex. 38 | 3.1 | ○ | A | 8.3 | 100/100 | 586 | 1.04 | 1.3 | −1.1 | 2.0 |
| Ex. 39 | 2.6 | ○ | A | 8.2 | 100/100 | 588 | 1.00 | 1.4 | −0.9 | 2.1 |
| Ex. 40 | 2.6 | ○ | A | 8.0 | 100/100 | 588 | 1.02 | 1.3 | −1.0 | 2.3 |
| Ex. 41 | 2.6 | ○ | A | 8.5 | 100/100 | 588 | 1.01 | 1.3 | −1.0 | 2.2 |
| Ex. 42 | 2.7 | ○ | A | 8.4 | 100/100 | 590 | 0.87 | −4 | −3.0 | 0.9 |
| Ex. 43 | 2.6 | ○ | A | 8.0 | 100/100 | 588 | 1.02 | 1.4 | −0.8 | 2.3 |
| Ex. 44 | 2.8 | ○ | A | 8.7 | 100/100 | 588 | 1.02 | 1.3 | −0.8 | 1.8 |

TABLE 8

Photochromic lens (uncoated)

| No. | Lens base member | Photochromic composition | Coating composition | λmax (nm) | Color density | a* When developing color | a* When fading | ΔYI | Hv (kg/mm²) |
|---|---|---|---|---|---|---|---|---|---|
| Comp. Ex. 10 | MRB | A | comp. composition 1 | 588 | 1.04 | 1.2 | −1.1 | 10.7 | 5.2 |
| Comp. Ex. 11 | MRA | A | comp. composition 2 | 588 | 1.04 | 1.3 | −1.0 | 11.0 | 5.2 |
| Comp. Ex. 12 | MRB | A | comp. composition 3 | 588 | 1.04 | 1.2 | −1.1 | 10.7 | 5.2 |
| Comp. Ex. 13 | CR | A | comp. composition 4 | 588 | 1.04 | 1.2 | −1.2 | 11.1 | 5.1 |
| Comp. Ex. 14 | MRB | A | comp. composition 5 | 588 | 1.04 | 1.2 | −1.1 | 10.7 | 5.2 |
| Comp. Ex. 15 | MRB | A | comp. composition 6 | 588 | 1.04 | 1.2 | −1.1 | 10.7 | 5.2 |

TABLE 8-continued

| | Photochromic hard-coated lens | | | | | | | | | |
|---|---|---|---|---|---|---|---|---|---|---|
| | Thickness of hard coating (μm) | Appearance | Steel wool scratch resistance | Bayer scratch resistance | Adhesion to convex surface | λmax (nm) | Color density | a* When developing color | When fading | ΔYI |
| Comp. Ex. 10 | 3.0 | ○ | A | 4.3 | 100/100 | 588 | 0.98 | 1.3 | −1.0 | 4.7 |
| Comp. Ex. 11 | 3.0 | ○ | A | 4.7 | 100/100 | 588 | 0.97 | 1.2 | −1.1 | 5.4 |
| Comp. Ex. 12 | 2.8 | ○ | A | 4.8 | 100/100 | 586 | 0.98 | 1.5 | −0.8 | 5.8 |
| Comp. Ex. 13 | 2.6 | ○ | A | 4.8 | 100/100 | 586 | 0.98 | 1.5 | −0.8 | 5.5 |
| Comp. Ex. 14 | 2.9 | ○ | D | 2.8 | 100/100 | 580 | 0.88 | 3.2 | 0.3 | 8.9 |
| Comp. Ex. 15 | 2.8 | ○ | B | 3.1 | 100/100 | 582 | 1.02 | 1.5 | −0.9 | 8.1 |

| | | | | Photochromic lens (uncoated) | | | | | |
|---|---|---|---|---|---|---|---|---|---|
| | Lens base member | Photochromic composition | Coating composition | properties λmax (nm) | Color density | a* When developing color | When fading | ΔYI | Hv (kg/mm²) |
| Comp. Ex. 16 | MRB | A | comp. composition 7 | 588 | 1.04 | 1.2 | −1.1 | 10.7 | 5.2 |
| Comp. Ex. 17 | MRB | A | comp. composition 8 | 588 | 1.04 | 1.2 | −1.1 | 10.7 | 5.2 |
| Comp. Ex. 18 | MRB | A | comp. composition 9 | 588 | 1.04 | 1.2 | −1.1 | 10.7 | 5.2 |
| Comp. Ex. 19 | MRB | A | comp. composition 10 | 588 | 1.04 | 1.2 | −1.1 | 10.7 | 5.2 |
| Comp. Ex. 20 | MRB | O | comp. composition 5 | 578 | 0.82 | 3.9 | −0.2 | 6.1 | 5.3 |
| Comp. Ex. 21 | MRB | A | TS56H | 588 | 1.04 | 1.2 | −1.1 | 10.7 | 5.2 |

| | Photochromic hard-coated lens | | | | | | | | | |
|---|---|---|---|---|---|---|---|---|---|---|
| | Thickness of hard coating (μm) | Appearance | Steel wool scratch resistance | Bayer scratch resistance | Adhesion to convex surface | λmax (nm) | Color density | a* When developing color | When fading | ΔYI |
| Comp. Ex. 16 | 2.7 | ○ | C | 3.0 | 100/100 | 580 | 0.92 | 2.8 | 0.1 | 8.5 |
| Comp. Ex. 17 | 2.7 | ○ | A | 3.4 | 100/100 | 582 | 0.94 | 1.8 | −0.4 | 5.0 |
| Comp. Ex. 18 | — | X (cracked) | — | — | — | — | — | — | — | — |
| Comp. Ex. 19 | 2.8 | ○ | A | 4.3 | 100/100 | 588 | 1.01 | 1.4 | −1.0 | 3.8 |

TABLE 8-continued

| | | | | | | | | | | |
|---|---|---|---|---|---|---|---|---|---|---|
| Comp. Ex. 20 | 2.9 | ◯ | D | 2.5 | 100/100 | 578 | 0.81 | 4.0 | −0.2 | 4.1 |
| Comp. Ex. 21 | 3.0 | ◯ | A | 3.2 | 100/100 | 584 | 0.99 | 2.5 | 0.3 | 5.3 |

As will be obvious from the above Examples, the optical articles having hard coatings formed by using the coating compositions of the present invention exhibit Bayer scratch resistances that are improved by more than two folds as compared to the optical articles having hard coatings formed by using the coating compositions of Comparative Examples. Further, the photochromic hard-coated lenses having hard coatings formed by using the coating compositions of the present invention exhibit nearly the same a*-value as that of the uncoated photochromic lenses; i.e., develop the intended color tones without almost tinted in red. Besides, the photochromic hard-coated lenses of the present invention are little yellow-deteriorated even after used for extended periods of time making it possible to decrease the degree of yellow deterioration (ΔYI) to be not larger than 3.5 and, particularly, not larger than 3.0 yet offering good appearance, scratch resistance and adhesiveness.

The invention claimed is:

1. A coating composition comprising:
   (a) a fine granular silica having a grain size of not larger than 30 nm;
   (b) organosilicon compound components containing an epoxy group-containing organosilicon compound (b1) and tetraalkoxysilane (b2) at a mass ratio (b1/b2) of 0.25 to 4.0;
   (c) water;
   (d) a curing catalyst comprising a complex containing aluminum as a core metal; and
   (e) a water-soluble organic solvent in an amount of 10 to 200 parts by mass per total amount of said fine granular silica (a) and said organosilicon compound components (b) of 100 parts by mass;
   wherein said fine granular silica (a) is contained in an amount of 15 to 55 parts by mass, said water (c) is contained in an amount of 100 to 200 parts by mass and said curing catalyst (d) is contained in an amount of 0.1 to 5.0 parts by mass per the total amount of said fine granular silica (a) and said organosilicon compound components (b) of 100 parts by mass,
   wherein said organosilicon compound components (b) are contained in an amount of 85 to 45 parts by mass per the total amount of said fine granular silica (a) and said organosilicon compound components (b) of 100 parts by mass, and
   wherein a mass ratio (c/e) of water (c) and the water-soluble organic solvent (e) is 0.5 to 10.0.

2. A photochromic optical article comprising a photochromic optical base member and a hard coating formed on a surface of said photochromic optical base member, said hard coating being the one obtained by curing the coating composition of claim 1.

3. The photochromic optical article according to claim 2, wherein said photochromic optical base member has a photochromic coating formed on the surface of a light-transmitting member by curing a curable composition that contains a photochromic compound, and said hard coating is formed on the surface of said photochromic coating.

4. The photochromic optical article according to claim 3, wherein said photochromic coating is obtained by photopolymerizing a curable composition that contains at least one kind of photochromic compound.

5. The photochromic optical article according to claim 3, wherein said light-transmitting member is a plastic lens, and said photochromic coating has a Vickers' hardness of 0.3 to 10 kg/mm$^2$.

6. The photochromic optical article according to claim 4, wherein said photochromic compound has an amino group.

7. The photochromic optical article according to claim 6, wherein said amino group has a substituent with 1 to 10 carbon atoms.

8. The photochromic optical article according to claim 7, wherein said substituent possessed by the amino group is a heterocyclic group containing a nitrogen atom constituting the amino group as a hetero atom, and the number of the hetero atom in said heterocyclic group is not larger than 4.

9. The photochromic optical article according to claim 7, wherein the amino group is a dialkylamino group.

10. The photochromic optical article according to claim 3, wherein said photochromic optical article exhibits a degree of yellow deterioration (ΔYI) of not larger than 3.5 when it is irradiated with light for 100 hours by using a xenon arc lamp of 2.5 kW as a source of light under the conditions of an irradiation intensity of 40 W/m$^2$ and an irradiated surface temperature of 50° C.

11. A method of producing a photochromic optical article comprising steps of:
   forming a photochromic coating by applying a curable composition containing 0.1 to 10.0% by mass of a photochromic compound having an amino group onto a light-transmitting member, and curing said curable composition; and
   forming a hard coating by applying the coating composition of claim 1 onto said photochromic coating and curing said coating composition.

* * * * *